United States Patent
Braness et al.

(10) Patent No.: US 8,914,534 B2
(45) Date of Patent: Dec. 16, 2014

(54) SYSTEMS AND METHODS FOR ADAPTIVE BITRATE STREAMING OF MEDIA STORED IN MATROSKA CONTAINER FILES USING HYPERTEXT TRANSFER PROTOCOL

(75) Inventors: Jason Braness, San Diego, CA (US); Auke Sjoerd van der Schaar, Los Angeles, CA (US); Kourosh Soroushian, San Diego, CA (US)

(73) Assignee: Sonic IP, Inc., San Diego, CA (US)

( * ) Notice: Subject to any disclaimer, the term of this patent is extended or adjusted under 35 U.S.C. 154(b) by 129 days.

(21) Appl. No.: 13/221,682

(22) Filed: Aug. 30, 2011

(65) Prior Publication Data
US 2012/0173751 A1 Jul. 5, 2012

Related U.S. Application Data

(60) Provisional application No. 61/430,110, filed on Jan. 5, 2011.

(51) Int. Cl.
*G06F 15/16* (2006.01)
*H04N 21/6587* (2011.01)
(Continued)

(52) U.S. Cl.
CPC .......... *H04N 21/6587* (2013.01); *G11B 27/005* (2013.01); *G11B 27/11* (2013.01); *G11B*
(Continued)

(58) Field of Classification Search
CPC ............ H06F 15/16; H06F 17/30; H04N 5/91
USPC .................................. 709/231–232
See application file for complete search history.

(56) References Cited

U.S. PATENT DOCUMENTS
5,361,332 A 11/1994 Yoshida et al.
5,404,436 A 4/1995 Hamilton
(Continued)

FOREIGN PATENT DOCUMENTS
EP 813167 A2 12/1997
WO 2004102571 A1 11/2004
(Continued)

OTHER PUBLICATIONS

Microsoft01—Title: IIS Smooth streaming technical overview, Author Alex Zambelli, Microsoft Corporation, Mar. 2009.*
(Continued)

*Primary Examiner* — Oleg Survillo
*Assistant Examiner* — Janakkumar Patel
(74) *Attorney, Agent, or Firm* — KPPB LLP

(57) ABSTRACT

Systems and methods for adaptive bitrate streaming of media stored in Matroska container files utilizing Hypertext Transfer Potocol (HTTP) in accordance with embodiments of the invention are disclosed. In one embodiment, a processor configured, via a client application, to request portions of files from a remote server. In addition, the client application further configures the processor to retrieve top level index data that identifies a plurality of EBML container files and describes at least a maximum bitrate of the alternative streams contained within the EBML container files, parse the top level index data to obtain information identifying the plurality of EBML container files, request a portion of at least one of the EBML container files that contains the at least one element that specifies the encoding parameters of the stream contained within the EBML container file, retrieve an index that references each element containing portions of encoded video within at least one of the EBML container files, utilize the index to request portions of a first EBML container file that includes elements that contain portions of encoded video, receive and buffer the requested elements, decode the encoded video contained within the buffered elements utilizing the encoding parameters, measure current streaming conditions, and select another of the EBML container files from which to retrieve elements containing portions of encoded video for decoding, where the selection is based upon the measured streaming conditions and the description of the bitrate of the alternative stream contained within the top level data.

32 Claims, 13 Drawing Sheets

(51) Int. Cl.
*G11B 27/00* (2006.01)
*G11B 27/11* (2006.01)
*G11B 27/32* (2006.01)
*H04N 21/2387* (2011.01)
*H04L 29/06* (2006.01)
*H04N 21/2343* (2011.01)
*H04N 21/262* (2011.01)
*H04N 21/2662* (2011.01)
*H04N 21/845* (2011.01)
*H04N 21/8543* (2011.01)
*H04N 21/854* (2011.01)
*H04N 21/442* (2011.01)

(52) U.S. Cl.
CPC .. 27/322 (2013.01); *H04N 21/2387* (2013.01); *H04L 65/4084* (2013.01); *H04L 65/4092* (2013.01); *H04L 65/607* (2013.01); *H04N 21/23439* (2013.01); *H04N 21/26258* (2013.01); *H04N 21/2662* (2013.01); *H04N 21/8455* (2013.01); *H04N 21/8456* (2013.01); *H04N 21/8543* (2013.01); *H04N 21/85406* (2013.01); *H04N 21/44209* (2013.01)
USPC .......................................... 709/231; 709/232

(56) References Cited

U.S. PATENT DOCUMENTS

| | | | |
|---|---|---|---|
| 5,715,403 | A | 2/1998 | Stefik |
| 6,031,622 | A | 2/2000 | Ristow et al. |
| 6,064,794 | A | 5/2000 | Mclaren et al. |
| 6,141,754 | A | 10/2000 | Choy |
| 6,155,840 | A | 12/2000 | Sallette |
| 6,195,388 | B1 | 2/2001 | Choi et al. |
| 6,658,056 | B1 | 12/2003 | Duruöz et al. |
| 6,807,306 | B1 * | 10/2004 | Girgensohn et al. .......... 382/225 |
| 6,859,496 | B1 | 2/2005 | Boroczky et al. |
| 6,956,901 | B2 | 10/2005 | Boroczky et al. |
| 7,242,772 | B1 | 7/2007 | Tehranchi |
| 7,478,325 | B2 | 1/2009 | Foehr |
| 7,991,156 | B1 | 8/2011 | Miller |
| 8,023,562 | B2 | 9/2011 | Zheludkov et al. |
| 8,046,453 | B2 | 10/2011 | Olaiya |
| 8,054,880 | B2 | 11/2011 | Yu et al. |
| 8,225,061 | B2 | 7/2012 | Greenebaum |
| 8,233,768 | B2 | 7/2012 | Soroushian et al. |
| 8,249,168 | B2 | 8/2012 | Graves |
| 8,270,473 | B2 | 9/2012 | Chen et al. |
| 8,270,819 | B2 | 9/2012 | Vannier |
| 8,289,338 | B2 | 10/2012 | Priyadarshi et al. |
| 8,291,460 | B1 | 10/2012 | Peacock |
| 8,311,115 | B2 | 11/2012 | Gu et al. |
| 8,321,556 | B1 | 11/2012 | Chatterjee et al. |
| 8,386,621 | B2 | 2/2013 | Park |
| 8,412,841 | B1 | 4/2013 | Swaminathan et al. |
| 8,456,380 | B2 | 6/2013 | Pagan |
| 8,472,792 | B2 | 6/2013 | Butt |
| 8,515,265 | B2 | 8/2013 | Kwon et al. |
| 2001/0036355 | A1 | 11/2001 | Kelly et al. |
| 2003/0002578 | A1 | 1/2003 | Tsukagoshi et al. |
| 2003/0152370 | A1 | 8/2003 | Otomo et al. |
| 2003/0163824 | A1 | 8/2003 | Gordon et al. |
| 2003/0231863 | A1 | 12/2003 | Eerenberg et al. |
| 2003/0231867 | A1 | 12/2003 | Gates et al. |
| 2003/0233464 | A1 | 12/2003 | Walpole et al. |
| 2003/0236836 | A1 | 12/2003 | Borthwick |
| 2003/0236907 | A1 | 12/2003 | Stewart et al. |
| 2004/0136698 | A1 | 7/2004 | Mock |
| 2004/0158878 | A1 | 8/2004 | Ratnakar et al. |
| 2005/0038826 | A1 * | 2/2005 | Bae et al. .................... 707/200 |
| 2005/0114896 | A1 | 5/2005 | Hug |
| 2005/0193070 | A1 | 9/2005 | Brown et al. |
| 2005/0193322 | A1 | 9/2005 | Lamkin et al. |
| 2005/0204289 | A1 | 9/2005 | Mohammed et al. |
| 2005/0207442 | A1 | 9/2005 | Zoest et al. |
| 2005/0207578 | A1 | 9/2005 | Matsuyama et al. |
| 2005/0273695 | A1 | 12/2005 | Schnurr |
| 2005/0275656 | A1 | 12/2005 | Corbin et al. |
| 2006/0078301 | A1 | 4/2006 | Ikeda et al. |
| 2006/0129909 | A1 | 6/2006 | Butt et al. |
| 2006/0173887 | A1 | 8/2006 | Breitfeld et al. |
| 2006/0245727 | A1 | 11/2006 | Nakano et al. |
| 2006/0259588 | A1 | 11/2006 | Lerman et al. |
| 2006/0263056 | A1 | 11/2006 | Lin et al. |
| 2007/0031110 | A1 | 2/2007 | Rijckaert |
| 2007/0047901 | A1 | 3/2007 | Ando et al. |
| 2007/0083617 | A1 | 4/2007 | Chakrabarti et al. |
| 2007/0086528 | A1 | 4/2007 | Mauchly et al. |
| 2007/0140647 | A1 * | 6/2007 | Kusunoki et al. ............... 386/68 |
| 2007/0154165 | A1 | 7/2007 | Hemmeryckx-Deleersnijder et al. |
| 2007/0168541 | A1 | 7/2007 | Gupta et al. |
| 2007/0168542 | A1 | 7/2007 | Gupta et al. |
| 2007/0178933 | A1 | 8/2007 | Nelson |
| 2007/0180125 | A1 | 8/2007 | Knowles et al. |
| 2007/0239839 | A1 | 10/2007 | Buday et al. |
| 2007/0292107 | A1 | 12/2007 | Yahata et al. |
| 2008/0120389 | A1 | 5/2008 | Bassali et al. |
| 2008/0126248 | A1 | 5/2008 | Lee et al. |
| 2008/0137736 | A1 | 6/2008 | Richardson et al. |
| 2008/0192818 | A1 | 8/2008 | DiPietro et al. |
| 2008/0195744 | A1 | 8/2008 | Bowra et al. |
| 2008/0256105 | A1 | 10/2008 | Nogawa et al. |
| 2008/0263354 | A1 | 10/2008 | Beuque |
| 2008/0279535 | A1 | 11/2008 | Haque et al. |
| 2008/0310454 | A1 | 12/2008 | Bellwood et al. |
| 2008/0310496 | A1 | 12/2008 | Fang |
| 2009/0031220 | A1 | 1/2009 | Tranchant et al. |
| 2009/0048852 | A1 | 2/2009 | Burns et al. |
| 2009/0055546 | A1 | 2/2009 | Jung et al. |
| 2009/0060452 | A1 | 3/2009 | Chaudhri |
| 2009/0066839 | A1 | 3/2009 | Jung et al. |
| 2009/0132599 | A1 * | 5/2009 | Soroushian et al. ......... 707/104.1 |
| 2009/0132721 | A1 | 5/2009 | Soroushian et al. |
| 2009/0150557 | A1 | 6/2009 | Wormley et al. |
| 2009/0169181 | A1 * | 7/2009 | Priyadarshi et al. .......... 386/124 |
| 2009/0201988 | A1 | 8/2009 | Gazier et al. |
| 2009/0226148 | A1 | 9/2009 | Nesvadba et al. |
| 2009/0290706 | A1 | 11/2009 | Amini et al. |
| 2009/0293116 | A1 | 11/2009 | DeMello |
| 2009/0303241 | A1 | 12/2009 | Priyadarshi et al. |
| 2009/0307258 | A1 | 12/2009 | Priyadarshi et al. |
| 2009/0307267 | A1 | 12/2009 | Chen et al. |
| 2009/0313544 | A1 | 12/2009 | Wood et al. |
| 2009/0313564 | A1 | 12/2009 | Rottler et al. |
| 2009/0328124 | A1 | 12/2009 | Khouzam et al. |
| 2009/0328228 | A1 | 12/2009 | Schnell |
| 2010/0040351 | A1 | 2/2010 | Toma et al. |
| 2010/0058405 | A1 | 3/2010 | Ramakrishnan et al. |
| 2010/0074324 | A1 | 3/2010 | Qian et al. |
| 2010/0083322 | A1 | 4/2010 | Rouse |
| 2010/0095121 | A1 | 4/2010 | Shetty et al. |
| 2010/0107260 | A1 | 4/2010 | Orrell et al. |
| 2010/0111192 | A1 | 5/2010 | Graves |
| 2010/0158109 | A1 | 6/2010 | Dahlby et al. |
| 2010/0186092 | A1 | 7/2010 | Takechi et al. |
| 2010/0189183 | A1 | 7/2010 | Gu et al. |
| 2010/0228795 | A1 | 9/2010 | Hahn |
| 2010/0235472 | A1 | 9/2010 | Sood et al. |
| 2011/0047209 | A1 | 2/2011 | Lindholm et al. |
| 2011/0066673 | A1 | 3/2011 | Outlaw |
| 2011/0080940 | A1 | 4/2011 | Bocharov |
| 2011/0082924 | A1 | 4/2011 | Gopalakrishnan |
| 2011/0126191 | A1 | 5/2011 | Hughes et al. |
| 2011/0135090 | A1 | 6/2011 | Chan |
| 2011/0142415 | A1 | 6/2011 | Rhyu |
| 2011/0145726 | A1 | 6/2011 | Wei et al. |
| 2011/0149753 | A1 | 6/2011 | Bapst et al. |
| 2011/0150100 | A1 | 6/2011 | Abadir |
| 2011/0153785 | A1 * | 6/2011 | Minborg et al. ............... 709/219 |
| 2011/0197237 | A1 | 8/2011 | Turner |
| 2011/0225315 | A1 | 9/2011 | Wexler et al. |
| 2011/0225417 | A1 | 9/2011 | Maharajh et al. |
| 2011/0239078 | A1 | 9/2011 | Luby et al. |

(56) References Cited

U.S. PATENT DOCUMENTS

| | | | |
|---|---|---|---|
| 2011/0246657 A1 | 10/2011 | Glow | |
| 2011/0246659 A1 | 10/2011 | Bouazizi | |
| 2011/0268178 A1 | 11/2011 | Park et al. | |
| 2011/0302319 A1 | 12/2011 | Ha et al. | |
| 2011/0305273 A1 | 12/2011 | He et al. | |
| 2011/0314176 A1* | 12/2011 | Frojdh et al. | 709/236 |
| 2012/0023251 A1 | 1/2012 | Pyle et al. | |
| 2012/0093214 A1 | 4/2012 | Urbach | |
| 2012/0170642 A1 | 7/2012 | Braness et al. | |
| 2012/0170643 A1 | 7/2012 | Soroushian et al. | |
| 2012/0170906 A1 | 7/2012 | Soroushian et al. | |
| 2012/0170915 A1 | 7/2012 | Braness et al. | |
| 2012/0179834 A1 | 7/2012 | Van Der et al. | |
| 2012/0254455 A1 | 10/2012 | Adimatyam et al. | |
| 2012/0260277 A1 | 10/2012 | Kosciewicz | |
| 2012/0278496 A1 | 11/2012 | Hsu | |
| 2012/0307883 A1 | 12/2012 | Graves | |
| 2012/0311094 A1 | 12/2012 | Biderman et al. | |
| 2013/0044821 A1 | 2/2013 | Braness et al. | |
| 2013/0046902 A1 | 2/2013 | Villegas Nuñez et al. | |
| 2013/0061040 A1 | 3/2013 | Kiefer et al. | |
| 2013/0061045 A1 | 3/2013 | Kiefer et al. | |
| 2013/0166765 A1 | 6/2013 | Kaufman | |
| 2013/0166906 A1 | 6/2013 | Swaminathan et al. | |
| 2014/0101722 A1 | 4/2014 | Moore | |
| 2014/0189065 A1 | 7/2014 | Schaar et al. | |
| 2014/0201382 A1 | 7/2014 | Shivadas et al. | |

FOREIGN PATENT DOCUMENTS

| | | |
|---|---|---|
| WO | 2009065137 A1 | 5/2009 |
| WO | 2010060106 A1 | 5/2010 |
| WO | 2010122447 A1 | 10/2010 |
| WO | 2011103364 A1 | 8/2011 |
| WO | 2012/094181 | 7/2012 |
| WO | 2012/094189 | 7/2012 |
| WO | 2012094171 | 7/2012 |
| WO | 2013032518 A2 | 3/2013 |
| WO | 2013032518 A3 | 9/2013 |

OTHER PUBLICATIONS

IPCOM—IPCOM000008165D-Title : Method for the encoding of a compressed video sequence derived from the same video sequence compressed at a different bit rate without loss of data; ip.com publication: May 22, 2002.*
International Search Report and Written Opinion for International Application PCT/US2011/66927, completed Apr. 3, 2012, 15 pgs.
International Search Report and Written Opinion for International Application PCT/US2011/067167, International Filing Date Dec. 23, 2011, Report Completed Jun. 19, 2012, Mailed Jul. 2, 2012, 11 pgs.
"Informationweek: Front End: Daily Dose, Internet on Wheels", Jul. 20, 1999, 3 pgs.
"Supported Media Formats", Supported Media Formats, Android Developers, Nov. 27, 2013, 3 pgs.
"Transcoding Best Practices", From movideo, Nov. 27, 2013, 5 pgs.
Akhshabi et al., "An Experimental Evaluation of Rate-Adaptation Algorithms in Adaptive Streaming over HTTP", MMSys'11, Feb. 23-25, 2011, 12 pgs.
Ghosh, "Enhancing Silverlight Video Experiences with Contextual Data", Mar. 2010, printed from https://dl.dropboxusercontent.com.static/javascript/external/pdf-js/viewer.html?file=https, 3 pgs.
Levkov, "Mobile Encoding Guidelines for Android Powered Devices", Adobe Systems Inc., Addendum B, Dec. 2010, 42 pgs.
Nelson, "Smooth Streaming Deployment Guide", Microsoft Expression Encoder, Aug. 2010, 66 pgs.
Siglin, "Unifying Global Video Strategies, MP4 File Fragmentation for Broadcast, Mobile and Web Delivery", Nov. 16, 2011, 16 pgs.
"Adaptive Streaming Comparison", Jan. 28, 2010, 5 pgs.
Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 17, 2010, 14 pgs.
Gannes, "The Lowdown on Apple's HTTP Adaptive Bitrate Streaming", GigaOM, Jun. 10, 2009, 12 pgs.
Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 74 pgs.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Federal Computer Week, "Tool Speeds Info to Vehicles", Jul. 25, 1999, 5 pages.
HTTP Live Streaming Overview, Networking & Internet, Apple, Inc., Apr. 1, 2011, 38 pages.
International Search Report and Written Opinion for International Application PCT/US2011/068276, International Filing Date Dec. 31, 2011, Report completed Jun. 19, 2013, Mailed Jul. 8, 2013, 24 pages.
ITS International, "Fleet System Opts for Mobile Server", Aug. 26, 1999, 1 page.
European Search Report for Application 11855103.5, dated Jul. 2, 2013, 9 pages.
"European Search Report for Application 11855237.1", dated Jun. 25, 2014, 9 pgs.
"IBM Spearheading Intellectual Property Protection Technology for Information on the Internet; Cryptolope Containers Have Arrived", May 1, 1996, Business Wire, Retrieved from http://www.thefreelibrary.com/IBM+Spearheading+Intellectual+Property+Protection+Technology+for . . . -a018239381, 1 page.
Noé, Alexander, "Matroska File Format (under construction!)", Jun. 24, 2007, XP002617671, Retrieved from: http://web.archive.org/web/20070821155146/www.matroska.org/technical/specs/matroska.pdf, Retrieved on Jan. 19, 2011, pp. 1-51.
Kim, Kyuheon, "MPEG-2 ES/PES/TS/PSI", Kyung-Hee University, Oct. 4, 2010, 66 pages.
Pantos, R., "HTTP Live Streaming: draft-pantos-http-live-streaming-06", Published by the Internet Engineering Task Force (IETF), Mar. 31, 2011, 24 pages.
Schulzrinne, H. et al., "Real Time Streaming Protocol 2.0 (RTSP): draft-ietfmmusic-rfc2326bis-27", MMUSIC Working Group of the Internet Engineering Task Force (IETF), Mar. 9, 2011, 296 pages.
Wu, Feng et al., "Next Generation Mobile Multimedia Communications: Media Codec and Media Transport Perspectives", In China Communications, Oct. 2006, pp. 30-44.

* cited by examiner

SYSTEMS AND METHODS FOR ADAPTIVE BITRATE STREAMING OF MEDIA STORED IN MATROSKA CONTAINER FILES USING HYPERTEXT TRANSFER PROTOCOL

CROSS REFERENCE TO RELATED APPLICATIONS

This application claims priority to U.S. Provisional Application Ser. No. 61/430,110, entitled "Systems and Methods For Adaptive Bitrate Streaming of Media Stored in Matroska Files Using Hypertext Transfer Protocol", filed Jan. 5, 2011, the entirety of which is incorporated herein by reference.

FIELD OF THE INVENTION

The present invention generally relates to adaptive streaming and more specifically to adaptive bitrate streaming of encoded media contained within Matroska container files using Hypertext Transfer Protocol.

BACKGROUND

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the user's network bandwidth and CPU capacity) in real time and adjusting the quality of the streamed media accordingly. Typically, the source media is encoded at multiple bit rates and the playback device or client switches between streaming the different encodings depending on available resources.

Adaptive streaming solutions typically utilize either Hypertext Transfer Protocol (HTTP), published by the Internet Engineering Task Force and the World Wide Web Consortium as RFC 2616, or Real Time Streaming Protocol (RTSP), published by the Internet Engineering Task Force as RFC 2326, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device. RTSP is a network control protocol used to control streaming media servers. Playback devices issue control commands, such as "play" and "pause", to the server streaming the media to control the playback of media files. When RTSP is utilized, the media server records the state of each client device and determines the media to stream based upon the instructions received from the client devices and the client's state.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Wash., and Flash Dynamic Streaming developed by Adobe Systems Incorporated of San Jose, Calif. HTTP Adaptive Bitrate Streaming developed by Apple Computer Incorporated of Cupertino, Calif. implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by DivX, LLC of San Diego, Calif. utilizes an extension of the Matroska container format (i.e. is based upon the Matroska container format, but includes elements that are not specified within the Matroska format).

SUMMARY OF THE INVENTION

Systems and methods for adaptive bitrate streaming of media stored in Matroska container files utilizing Hypertext Transfer Potocol (HTTP) in accordance with embodiments of the invention are disclosed. In one embodiment, a processor configured, via a client application, to request portions of files from a remote server. In addition, the client application further configures the processor to retrieve top level index data that identifies a plurality of EBML container files and describes at least a maximum bitrate of the alternative streams contained within the EBML container files, parse the top level index data to obtain information identifying the plurality of EBML container files, request a portion of at least one of the EBML container files that contains the at least one element that specifies the encoding parameters of the stream contained within the EBML container file, retrieve an index that references each element containing portions of encoded video within at least one of the EBML container files, utilize the index to request portions of a first EBML container file that includes elements that contain portions of encoded video, receive and buffer the requested elements, decode the encoded video contained within the buffered elements utilizing the encoding parameters, measure current streaming conditions, and select another of the EBML container files from which to retrieve elements containing portions of encoded video for decoding, where the selection is based upon the measured streaming conditions and the description of the bitrate of the alternative stream contained within the top level data.

In a further embodiment, each of the EBML container files comprises a plurality of Cluster elements, where each Cluster element contains a portion of encoded video, and the portion of encoded video in each of the Cluster elements commences with an intra frame and includes at least one closed group of pictures.

In another embodiment, the portions of encoded video in each of the Cluster elements have the same duration.

In a still further embodiment, the portions of encoded video in each of the Cluster elements have a 2 second duration.

In still another embodiment, each Cluster element contains a time code and each encoded frame of the portion of encoded video contained within the Cluster element is contained within a separate BlockGroup element.

In a yet further embodiment, the first BlockGroup element in the Cluster element contains the intra frame.

In yet another embodiment, the first BlockGroup element contains a Block element, which specifies the time code attribute of the intra frame relative to the time code of the Cluster element.

In a further embodiment again, each of the alternative streams of encoded video is encoded at a different maximum bitrate.

In another embodiment again, at least two of the alternative streams of encoded video are encoded at the same display aspect ratio, but with different resolutions using different sample aspect ratios.

In a further additional embodiment, the at least one element in each of the EBML container files that specifies the encoding parameters of the stream contained within the EBML container file specifies the frame height, frame width and sample aspect ratio of the video stream contained within the EBML container file.

In another additional embodiment, the client application configures the processor to set the frame height, frame width, and sample aspect ratio prior to commencing the decoding of encoded video contained within buffered elements from one of the EBML container files.

In a still yet further embodiment, at least two of the alternative streams of encoded video are encoded at different frame rates.

In still yet another embodiment, the at least one element in each of the EBML container files that specifies the encoding parameters of the stream contained within the EBML container file specifies the frame rate of the video stream contained within the EBML container file.

In a still further embodiment again, the client application configures the processor to set the frame rate prior to commencing the decoding of encoded video contained within buffered elements from one of the EBML container files.

In still another embodiment again, the client application configures the playback device to request portions of files from remote servers via Hypertext Transfer Protocol (HTTP) byte range requests.

In a still further additional embodiment, the top level index data is SMIL data and the information that identifies the plurality of EBML container files is a plurality of Universal Resource Indicators that identify the location of each of the EBML container files.

In still another additional embodiment, the SMIL data specifies the maximum bitrate of the encoded stream contained within the EBML container file identified by each of the URIs.

In a yet further embodiment again, the index that references each of the elements containing portions of the encoded stream within the EBML container file is located within at least one element of the EBML container file, the SMIL file specifies the portions of the EBML container file that contain the elements that contain the encoding parameters, the client application further configures the processor to: parse the SMIL file to identify the portions of the EBML container file that contain the elements that contain the encoding parameters; and request the portions of the EBML container file that contain the elements that contain the encoding parameters.

In yet another embodiment again, each EBML container file includes at least one element containing an index that references each element containing portions of encoded video within the EBML container file, and the client application configures the processor to retrieve the index that references each element containing portions of encoded video within an EBML container file by requesting the portion of the EBML container file that includes the at least one element containing the index.

In a yet further additional embodiment, the index is located within a Cues element within the EBML container file.

In yet another additional embodiment, the Cues element includes a plurality of CuePoint elements that include a time attribute and point to the location of each element containing a portion of encoded video within the EBML file.

In a further additional embodiment again, the client application configures the processor to search for the location of an element containing a specific portion of encoded video within the EBML file using the time attributes of the CuePoint elements within the index, and request a portion of the EBML file including at least the element identified using the CuePoint elements.

In another additional embodiment again, the encoding parameters utilized to decode the encoded video include at least one encoding parameter selected from the group consisting of frame rate, frame height, frame width, sample aspect ratio, maximum bitrate, and minimum buffer size.

In a still yet further embodiment again, the client application configures the processor to measure the current streaming conditions by measuring the time taken to receive requested elements from the time at which the elements were requested.

In still yet another embodiment again, the client application configures the processor to initially request a portion of a first EBML container file containing at least one element that specifies the encoding parameters of the stream contained within the first EBML container file, and the client application further configures the processor to request a portion of a second EBML container file containing at least one element that specifies the encoding parameters of the stream contained within the second EBML container file, when the client application selects to retrieve elements containing portions of encoded video for decoding from the second EBML container file based upon the measured streaming conditions and the description of the bitrate of the alternative stream contained within the top level index.

In a still yet further additional embodiment, the playback device is further configured to perform adaptive bitrate streaming using an EBML container file that contains a trick play track.

In still yet another additional embodiment, the client application configures the processor to select the EBML container file containing the trick play track as the EBML container file from which to retrieve elements containing portions of encoded video in response to a user instruction.

In a yet further additional embodiment again, the playback device is further configured to perform adaptive streaming using at least one EBML container file containing a track of encoded audio.

In yet another additional embodiment again, the client application configures the processor to retrieve and decode encoded audio from one of the at least one EBML container files containing an audio track and to synchronize the decoded audio with the decoded video.

In a still yet further additional embodiment again, each of the EBML container files includes elements containing at least one track of encoded audio multiplexed with the encoded video.

In still yet another additional embodiment again, the client application is configured to retrieve portions of the EBML file containing elements that include portions of one of the tracks of encoded audio, decode the retrieved encoded audio, and synchronize the decoded audio and the decoded video.

In another further embodiment, the playback device is further configured to perform adaptive streaming using at least one EBML container file containing a subtitle track.

In still another further embodiment, the client application configures the processor to retrieve subtitles from one of the at least one EBML container files containing a subtitle track, synchronize the subtitle with the decoded video; and overlay the subtitle over the decoded video.

In yet another further embodiment, each of the EBML container files includes elements containing at least one subtitle track multiplexed with the encoded video.

In another further embodiment again, the client application is configured to retrieve portions of the EBML file containing elements that include portions of one of the subtitle tracks, synchronize the subtitles with the decoded video, and overlay the subtitles on the decoded video.

Another further additional embodiment includes retrieving top level index data that identifies each of the plurality of EBML container files and describes at least the maximum bitrate of each of the alternative streams contained within the EBML container files, parsing the top level index data to obtain information identifying the plurality of EBML container files, requesting a portion of at least one of the EBML container files that contains the at least one element that specifies the encoding parameters of the stream contained within the EBML container file, retrieving an index that references each element containing portions of encoded video within at least one of the EBML container files, utilizing the index to request portions of a first EBML container file that includes elements that contain portions of encoded video, receiving and buffering the requested elements, decoding the encoded video contained within the buffered elements utilizing the encoding parameters, measuring current streaming conditions, and selecting another of the EBML container files from which to retrieve elements containing portions of encoded video for decoding, where the selection is based upon the measured streaming conditions and the description of the bitrate of the alternative stream contained within the top level index data.

DETAILED DISCLOSURE OF THE INVENTION

Figure 1:
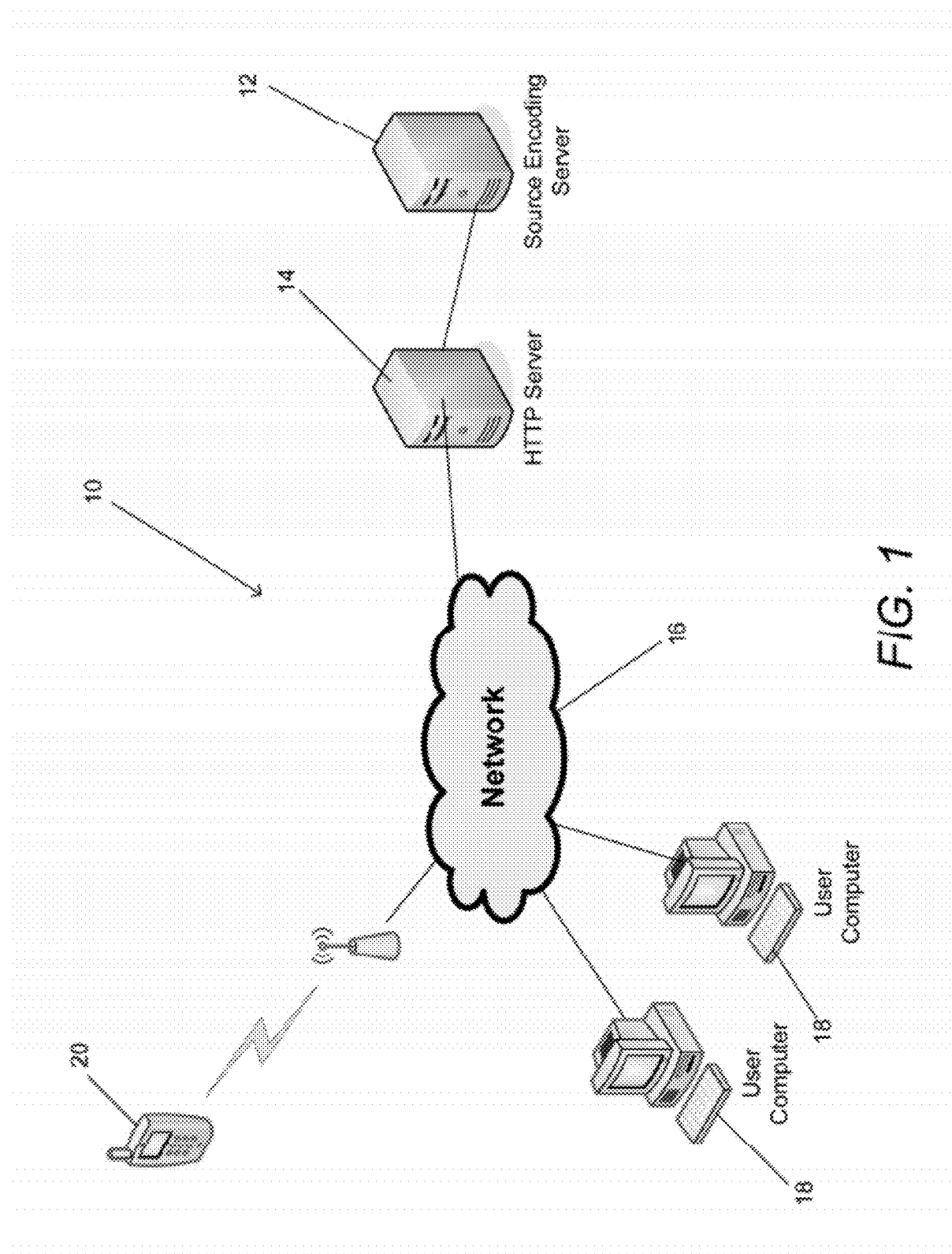
FIG. 1 is a network diagram of an adaptive bitrate streaming system in accordance with an embodiment of the invention.

Turning now to the drawings, systems and methods for adaptive bitrate streaming of media stored in Matroska container files utilizing Hypertext Transfer Potocol (HTTP) in accordance with embodiments of the invention are illustrated. In a number of embodiments, source media is encoded as a number of alternative streams. Each stream is stored in a Matroska (MKV) container file. In many embodiments, the Matroska container file is a specialized Matroska container file in that the manner in which the media in each stream is encoded and stored within the container is constrained to improve streaming performance. In several embodiments, the Matroska container file is further specialized in that additional index elements (i.e. elements that are not specified as part of the Matroska container format) can be included within the file to facilitate the retrieval of desired media during adaptive bitrate streaming. In several embodiments, each stream (i.e. audio, video, or subtitle) is stored within a separate Matroska container file. In other embodiments, an encoded video stream is multiplexed with one or more encoded audio, and/or subtitle streams in each Matroska container file. A top level index file containing an index to the streams contained within each of the container files is also generated to enable adaptive bitrate streaming of the encoded media. In many embodiments, the top level index file is a Synchronized Multimedia Integration Language (SMIL) file containing URIs for each of the Matroska container files. In other embodiments, any of a variety of file formats can be utilized in the generation of the top level index file.

The performance of an adaptive bitstrate streaming system in accordance with embodiments of the invention can be significantly enhanced by encoding each portion of the source video at each bit rate in such a way that the portion of video is encoded in each stream as a single (or at least one) closed group of pictures (GOP) starting with an Instantaneous Decoder Refresh (IDR) frame. The GOP for each stream can then be stored as a Cluster element within the Matroska container file for the stream. In this way, the playback device can switch between streams at the completion of the playback of a Cluster and, irrespective of the stream from which a Cluster is obtained the first frame in the Cluster will be an IDR frame and can be decoded without reference to any encoded media other than the encoded media contained within the Cluster element. In many embodiments, the sections of the source video that are encoded as GOPs are all the same duration. In a number of embodiments each two second sequence of the source video is encoded as a GOP.

Retrieval of media using HTTP during adaptive streaming can be improved by adding additional index information to the Matroska container files used to contain each of the encoded streams. In a number of embodiments, the index is a reduced index in that the index only points to the IDRs at the start of each cluster. In many embodiments, the index of the Matroska container file includes additional non-standard attributes (i.e. attributes that do not form part of the Matroska container file format specification) that specify the size of each of the clusters so that a playback device can retrieve a Cluster element from the Matroska container file via HTTP using a byte range request.

Adaptive streaming of source media encoded in the manner outlined above can be coordinated by a playback device in accordance with embodiments of the invention. The playback device obtains information concerning each of the available streams from the top level index file and selects one or more streams to utilize in the playback of the media. The playback device can then obtain header information from the Matroska container files containing the one or more bitstreams or streams, and the headers provide information concerning the decoding of the streams. The playback device can also request index information that indexes the encoded media stored within the relevant Matroska container files. The index information can be stored within the Matroska container files or separately from the Matroska container files in the top level index or in separate index files. The index information enables the playback device to request byte ranges corresponding to Cluster elements within the Matroska container file containing specific portions of encoded media via HTTP from the server. As the playback device receives the Cluster elements from the HTTP server, the playback device can evaluate current streaming conditions to determine whether to increase or decrease the bitrate of the streamed media. In the event that the playback device determines that a change in bitrate is necessary, the playback device can obtain header information and index information for the container file(s) containing the desired stream(s) (assuming the playback device has not already obtained this information). The index information can then be used to identify the byte range of the Cluster element containing the next portion of the source media encoded at the desired bit rate and the identified Cluster element can be retrieved from the server via HTTP. The next portion of the source media that is requested is typically identified based upon the Cluster elements already requested by the playback device and the Cluster elements buffered by the playback device. The next portion of source media requested from the alternative stream is requested to minimize the likelihood that the buffer of the playback device will underflow (i.e. run out media to playback) prior to receipt of the Cluster element containing the next portion of source media by the playback device. In this way, the playback device can achieve adaptive bitrate streaming by retrieving sequential Cluster elements from the various streams as appropriate to the streaming conditions using the top level index and index information describing the Cluster elements within each of the Matroska container files.

In a number of embodiments, variation in the bitrate between different streams can be achieved by modifying the encoding parameters for each stream including but not limited to the bitrate, frame rate, and resolution. When different streams include different resolutions, the display aspect ratio of each stream is the same and the sample aspect ratios are modified to ensure smooth transitions from one resolution to another. The encoding of source video for use in adaptive bitrate streaming and the playback of the encoded source video using HTTP requests to achieve adaptive bitrate streaming in accordance with embodiments of the invention is discussed further below.

Adaptive Streaming System Architecture

An adaptive streaming system in accordance with an embodiment of the invention is illustrated in FIG. 1. The adaptive streaming system 10 includes a source encoder 12 configured to encode source media as a number of alternative streams. In the illustrated embodiment, the source encoder is a server. In other embodiments, the source encoder can be any processing device including a processor and sufficient resources to perform the transcoding of source media (including but not limited to video, audio, and/or subtitles). As is discussed further below, the source encoding server 12 generates a top level index to a plurality of container files containing the streams, at least a plurality of which are alternative streams. Alternative streams are streams that encode the same media content in different ways. In many instances, alternative streams encode media content (such as but not limited to video) at different bitrates. In a number of embodiments, the alternative streams are encoded with different resolutions and/or at different frame rates. The top level index file and the container files are uploaded to an HTTP server 14. A variety of playback devices can then use HTTP or another appropriate stateless protocol to request portions of the top level index file and the container files via a network 16 such as the Internet.

In many embodiments, the top level index file is a SMIL file and the media is stored in Matroska container files. As is discussed further below, the media can be stored within the Matroska container file in a way that facilitates the adaptive bitrate streaming of the media. In many embodiments, the Matroska container files are specialized Matroska container files that include enhancements (i.e. elements that do not form part of the Matroska file format specification) that facilitate the retrieval of specific portions of media via HTTP during the adaptive bitrate streaming of the media.

In the illustrated embodiment, playback devices include personal computers 18 and mobile phones 20. In other embodiments, playback devices can include consumer electronics devices such as DVD players, Blu-ray players, televisions, set top boxes, video game consoles, tablets, and other devices that are capable of connecting to a server via HTTP and playing back encoded media. Although a specific architecture is shown in FIG. 1 any of a variety of architectures can be utilized that enable playback devices to request portions of the top level index file and the container files in accordance with embodiments of the invention.

File Structure

Figure 2:
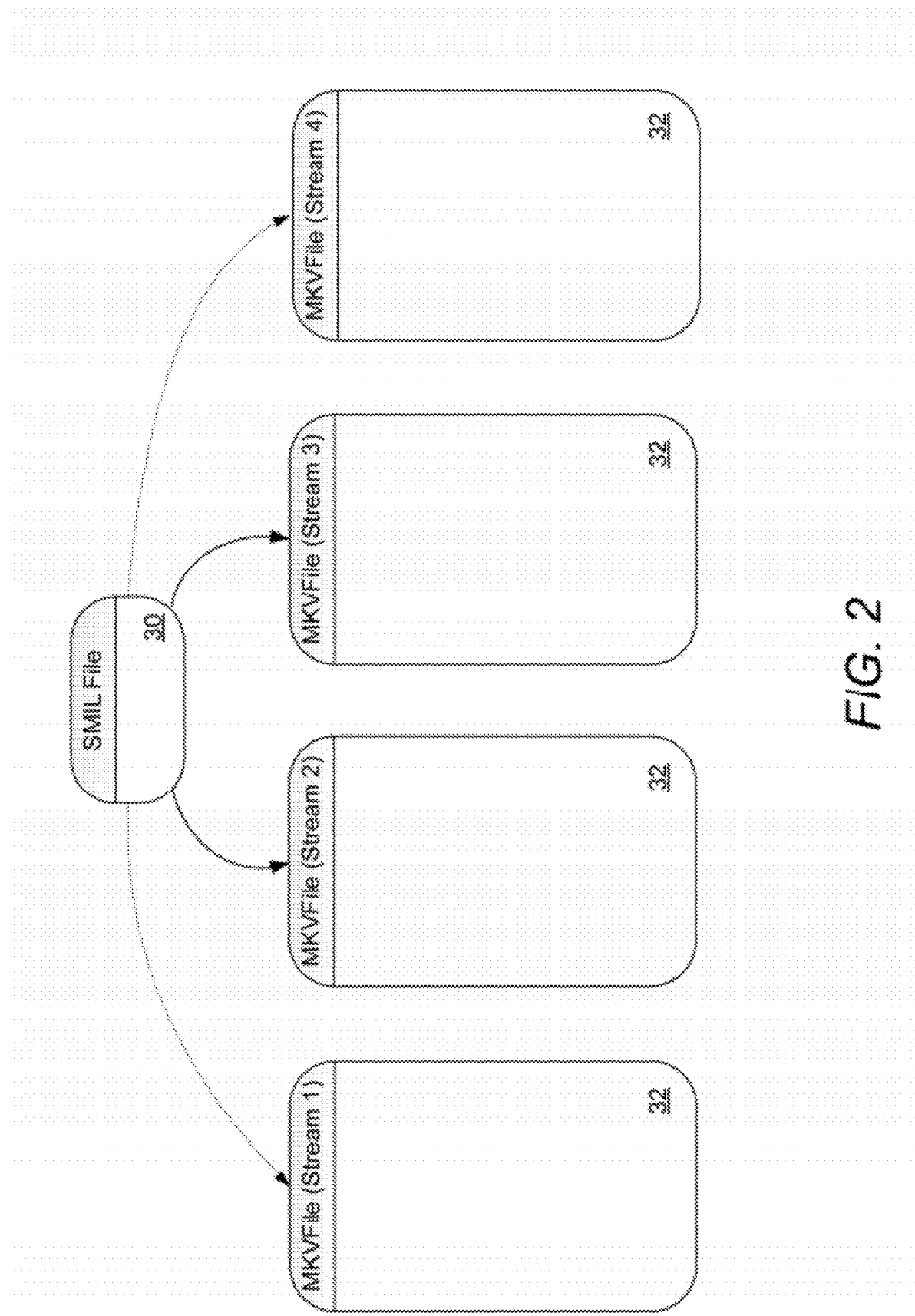
FIG. 2 conceptually illustrates a top level index file and Matroska container files generated by the encoding of source media in accordance with embodiments of the invention.

Files generated by a source encoder and/or stored on an HTTP server for streaming to playback devices in accordance with embodiments of the invention are illustrated in FIG. 2. The files utilized in the adaptive bitrate streaming of the source media include a top level index 30 and a plurality of container files 32 that each contain at least one stream. The top level index file describes the content of each of the container files. As is discussed further below, the top level index file can take a variety of forms including an SMIL file and the container files can take a variety of forms including a specialized Matroska container file.

In many embodiments, each Matroska container file contains a single stream. For example, the stream could be one of a number of alternate video streams, an audio stream, one of a number of alternate audio streams, a subtitle stream, one of a number of alternate subtitle streams, a trick play stream, or one of a number of alternate trick play streams. In several embodiments, the Matroska container file includes multiple multiplexed streams. For example, the Matroska container could include a video stream, and one or more audio streams, one or more subtitle streams, and/or one or more trick play streams. As is discussed further below, in many embodiments the Matroska container files are specialized files. The encoding of the media and the manner in which the media is stored within Cluster elements within the Matroska container file can be subject to constraints designed to enhance the performance of an adaptive bitrate streaming system. In addition, the Matroska container file can include index elements that facilitate the location and downloading of Cluster elements from the various Matroska container files during the adaptive streaming of the media. Top level index files and Matroska container files that can be used in adaptive bitrate streaming systems in accordance with embodiments of the invention are discussed below.

Top Level Index Files

Playback devices in accordance with many embodiments of the invention utilize a top level index file to identify the container files that contain the streams available to the playback device for use in adaptive bitrate streaming. In many embodiments, the top level index files can include references to container files that each include an alternative stream of encoded media. The playback device can utilize the information in the top level index file to retrieve encoded media from each of the container files according to the streaming conditions experienced by the playback device.

In several embodiments, the top level index file provides information enabling the playback device to retrieve information concerning the encoding of the media in each of the container files and an index to encoded media within each of the container files. In a number of embodiments, each container file includes information concerning the encoded media contained within the container file and an index to the encoded media within the container file and the top level index file indicates the portions of each container file containing this information. Therefore, a playback device can retrieve the top level index file and use the top level index file to request the portions of one or more of the container files that include information concerning the encoded media contained within the container file and an index to the encoded media within the container file. A variety of top level index files that can be utilized in adaptive bitrate streaming systems in accordance with embodiments of the invention are discussed further below.

Top Level Index SMIL Files

In a number of embodiments, the top level index file utilized in the adaptive bitrate streaming of media is a SMIL file, which is an XML file that includes a list of URIs describing each of the streams and the container files that contain the streams. The URI can include information such as the "system-bitrate" of the stream contained within the stream and information concerning the location of specific pieces of data within the container file.

The basic structure of a SMIL file involves providing an XML declaration and a SMIL element. The SMIL element defines the streams available for use in adaptive bitrate streaming and includes a HEAD element, which is typically left empty and a BODY element that typically only contains a PAR (parallel) element. The PAR element describes streams that can be played simultaneously (i.e. include media that can be presented at the same time).

The SMIL specification defines a number of child elements to the PAR element that can be utilized to specify the streams available for use in adaptive bitrate streaming. The VIDEO, AUDIO and TEXTSTREAM elements can be utilized to define a specific video, audio or subtitle stream. The VIDEO, AUDIO and TEXTSTREAM elements can collectively be referred to as media objects. The basic attributes of a media object are the SRC attribute, which specifies the full path or a URI to a container file containing the relevant stream, and the XML:LANG attribute, which includes a 3 letter language code. Additional information concerning a media object can be specified using the PARAM element. The PARAM element is a standard way within the SMIL format for providing a general name value pair. In a number of embodiments of the invention, specific PARAM elements are defined that are utilized during adaptive bitrate streaming.

In many embodiments, a "header-request" PARAM element is defined that specifies the size of the header section of the container file containing the stream. The value of the "header-request" PARAM element typically specifies the number of bytes between the start of the file and the start of the encoded media within the file. In many embodiments, the header contains information concerning the manner in which the media is encoded and a playback device retrieves the header prior to playback of the encoded media in order to be able to configure the decoder for playback of the encoded media. An example of a "header-request" PARAM element is follows:

```
<param
    name="header-request"
    value="1026"
    valuetype="data" />
```

In a number of embodiments, a "mime" PARAM element is defined that specifies the MIME type of the stream. A "mime" PARAM element that identifies the stream as being an H.264 stream (i.e. a stream encoded in accordance with the MPEG-4 Advanced Video Codec standard) is as follows:

```
<param
    name="mime"
    value="V_MPEG4/ISO/AVC"
    valuetype="data" />
```

The MIME type of the stream can be specified using a "mime" PARAM element as appropriate to the encoding of a specific stream (e.g. AAC audio or UTF-8 text stream).

When the media object is a VIDEO element, additional attributes are defined within the SMIL file format specification including the systemBitrate attribute, which specifies the bitrate of the stream in the container file identified by the VIDEO element, and width and height attributes, which specify the dimensions of the encoded video in pixels. Additional attributes can also be defined using the PARAM element. In several embodiments, a "vbv" PARAM element is defined that specified the VBV buffer size of the video stream in bytes. The video buffering verifier (VBV) is a theoretical MPEG video buffer model used to ensure that an encoded video stream can be correctly buffered and played back at the decoder device. An example of a "vbv" PARAM element that specifies a VBV size of 1000 bytes is as follows:

```
<param
    name="vbv"
    value="1000"
    valuetype="data" />
```

An example of VIDEO element including the attributes discussed above is as follows:

```
<video
    src="http://cnd.com/video1_620kbps.mkv"
    systemBitrate="620"
    width="480"
    height="270" >
    <param
        name="vbv"
        value="1000"
        valuetype="data" />
</video>
```

Adaptive bitrate streaming systems in accordance with embodiments of the invention can support trick play streams, which can be used to provide smooth visual search through source content encoded for adaptive bitrate streaming. A trick play stream can be encoded that appears to be an accelerated visual search through the source media when played back, when in reality the trick play stream is simply a separate track encoding the source media at a lower frame rate. In many embodiments of the system a VIDEO element that references a trick play track is indicated by the systemProfile attribute of the VIDEO element. In other embodiments, any of a variety of techniques can be utilized to signify within the top level index file that a specific stream is a trick play stream. An example of a trick play stream VIDEO element in accordance with an embodiment of the invention is as follows:

```
<video
    src="http://cnd.com/video_test2_600kbps.mkv"
    systemProfile="DivXPlusTrickTrack"
    width="480"
    height="240">
    <param name="vbv" value="1000" valuetype="data" />
    <param name="header-request" value="1000" valuetype="data" />
</video>
```

In a number of embodiments of the invention, a "reservedBandwidth" PARAM element can be defined for an AUDIO element. The "reservedBandwidth" PARAM element specifies the bitrate of the audio stream in Kbps. An example of an AUDIO element specified in accordance with an embodiment of the invention is as follows:

```
<audio
    src="http://cnd.com/audio_test1_277kbps.mkv"
    xml:lang="gem"
```

```
    <param
        name="reservedBandwidth"
        value="128"
        valuetype="data" />
/>
```

In several embodiments, the "reservedBandwidth" PARAM element is also defined for a TEXTSTREAM element. An example of a TEXTSTREAM element including a "reservedBandwidth" PARAM element in accordance with an embodiment of the invention is as follows:

```
<textstream
    src="http://cnd.com/text_stream_ger.mkv"
    xml:lang="gem"
    <param
        name="reservedBandwidth"
        value="32"
        valuetype="data" />
/>
```

In other embodiments, any of a variety of mechanisms can be utilized to specify information concerning VIDEO, AUDIO, and SUBTITLE elements as appropriate to specific applications.

A SWITCH element is a mechanism defined within the SMIL file format specification that can be utilized to define adaptive or alternative streams. An example of the manner in which a SWITCH element can be utilized to specify alternative video streams at different bitrates is as follows:

```
<switch>
    <video src="http://cnd.com/video_test1_300kbps.mkv"/>
    <video src="http://cnd.com/video_test2_900kbps.mkv"/>
    <video src="http://cnd.com/video_test3_1200kbps.mkv"/>
</switch>
```

The SWITCH element specifies the URLs of three alternative video streams. The file names indicate that the different bitrates of each of the streams. As is discussed further below, the SMIL file format specification provides mechanisms that can be utilized in accordance with embodiments of the invention to specify within the top level index SMIL file additional information concerning a stream and the container file in which it is contained.

In many embodiments of the invention, the EXCL (exclusive) element is used to define alternative tracks that do not adapt during playback with streaming conditions. For example, the EXCL element can be used to define alternative audio tracks or alternative subtitle tracks. An example of the manner in which an EXCL element can be utilized to specify alternative English and French audio streams is as follows:

```
<excl>
    <audio
        src="http://cnd.com/english-audio.mkv"
        xml:lang="eng"/>
    <audio
        src="http://cnd.com/french-audio.mkv"
        xml:lang="fre"/>
</excl>
```

An example of a top level index SMIL file that defines the attributes and parameters of two alternative video levels, an audio stream and a subtitle stream in accordance with an embodiment of the invention is as follows:

```
<?xml version="1.0" encoding="utf-8"?>
<smil xmlns="http://www.w3.org/ns/SMIL" version="3.0"
basePofile="Language">
    <head>
    </head>
    <body>
        <par>
            <switch>
                <video
                    src="http://cnd.com/video_test1_300kbps.mkv"
                    systemBitrate="300"
                    vbv="600"
                    width="320"
                    height="240" >
                    <param
                        name="vbv"
                        value="600"
                        valuetype="data" />
                    <param
                        name="header-request"
                        value="1000"
                        valuetype="data" />
                </video>
                <video
                    src="http://cnd.com/video_test2_600kbps.mkv"
                    systemBitrate="600"
                    vbv ="900"
                    width="640"
                    height="480">
                    <param
                        name="vbv"
                        value="1000"
                        valuetype="data" />
                    <param
                        name="header-request"
                        value="1000"
                        valuetype="data" />
                </video>
            </switch>
            <audio
                src="http://cnd.com/audio.mkv"
                xml:lang="eng">
                <param
                    name="header-request"
                    value="1000"
                    valuetype="data" />
                <param name="reservedBandwidth" value="128"
                    valuetype="data" />
            </audio>
            <textstream
                src="http://cnd.com/subtitles.mkv"
                xml:lang="eng">
                <param
                    name="header-request"
                    value="1000"
                    valuetype="data" />
                <param name="reservedBandwidth" value="32"
                    valuetype="data" />
            </textstream>
        </par>
    </body>
</smil>
```

The top level index SMIL file can be generated when the source media is encoded for playback via adaptive bitrate streaming. Alternatively, the top level index SMIL file can be generated when a playback device requests the commencement of playback of the encoded media. When the playback device receives the top level index SMIL file, the playback device can parse the SMIL file to identify the available streams. The playback device can then select the streams to utilize to playback the content and can use the SMIL file to identify the portions of the container file to download to obtain information concerning the encoding of a specific stream and/or to obtain an index to the encoded media within the container file.

Although top level index SMIL files are described above, any of a variety of top level index file formats can be utilized to create top level index files as appropriate to a specific application in accordance with an embodiment of the invention. The use of top level index files to enable playback of encoded media using adaptive bitrate streaming in accordance with embodiments of the invention is discussed further below.

Storing Media in Matroska Files for Adaptive Bitrate Streaming

Figure 3:
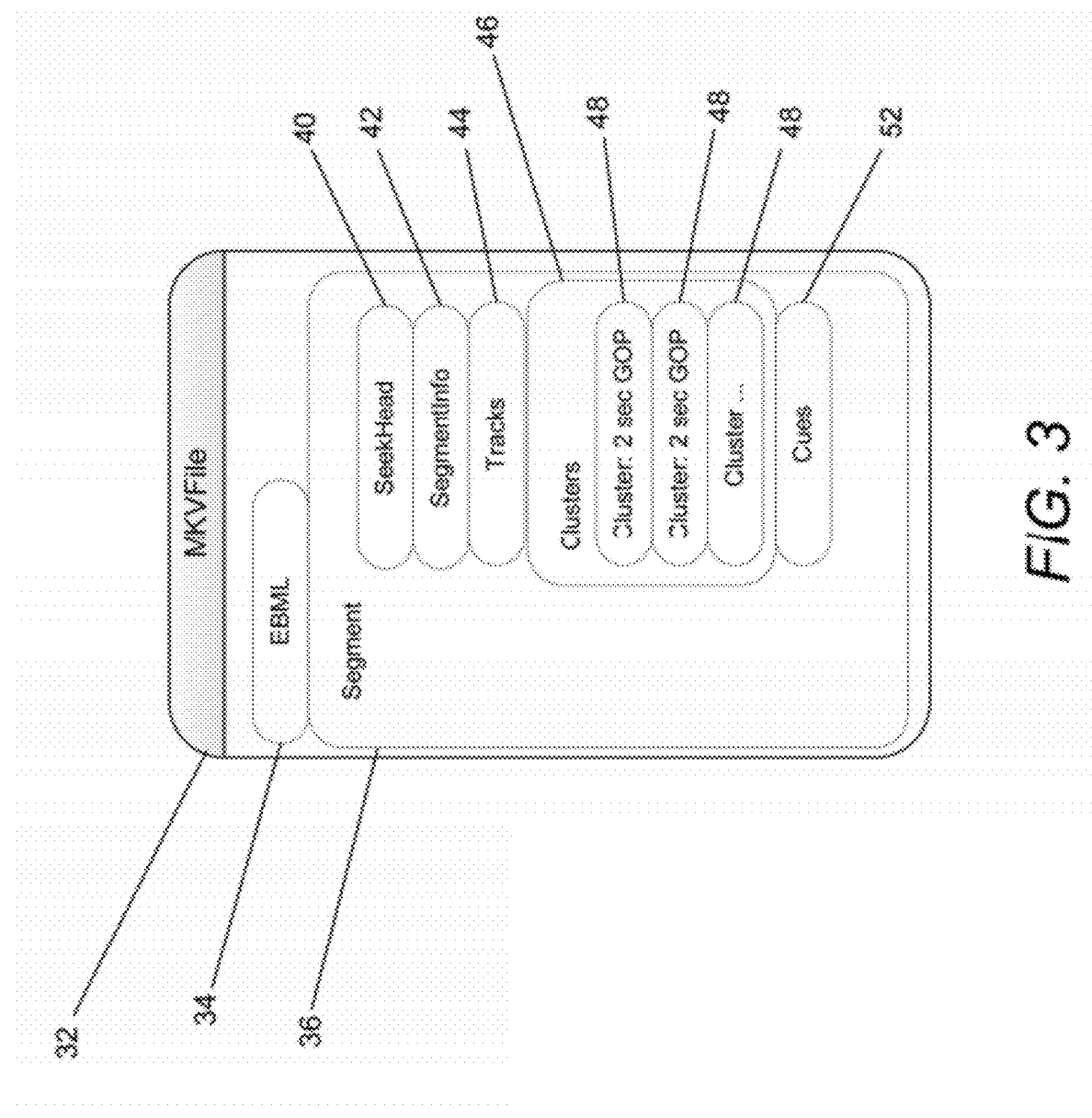
FIG. 3 conceptually illustrates a specialized Matroska container file incorporating a modified Cues element in accordance with an embodiment of the invention.

A Matroska container file used to store encoded video in accordance with an embodiment of the invention is illustrated in FIG. 3. The container file 32 is an Extensible Binary Markup Language (EBML) file that is an extension of the Matroska container file format. The specialized Matroska container file 32 includes a standard EBML element 34, and a standard Segment element 36 that includes a standard Seek Head element 40, a standard Segment Information element 42, and a standard Tracks element 44. These standard elements describe the media contained within the Matroska container file. The Segment element 36 also includes a standard Clusters element 46. As is described below, the manner in which encoded media is inserted within individual Cluster elements 48 within the Clusters element 46 is constrained to improve the playback of the media in an adaptive streaming system. In many embodiments, the constraints imposed upon the encoded video are consistent with the specification of the Matroska container file format and involve encoding the video so that each cluster includes at least one closed GOP commencing with an IDR frame. In addition to the above standard elements, the Segment element 36 also includes a modified version of the standard Cues element 52. As is discussed further below, the Cues element includes specialized CuePoint elements (i.e. non-standard CuePoint elements) that facilitate the retrieval of the media contained within specific Cluster elements via HTTP.

The constraints imposed upon the encoding of media and the formatting of the encoded media within the Clusters element of a Matroska container file for adaptive bitrate streaming and the additional index information inserted within the container file in accordance with embodiments of the invention is discussed further below.

Encoding Media for Insertion in Cluster Elements

An adaptive bitrate streaming system provides a playback device with the option of selecting between different streams of encoded media during playback according to the streaming conditions experienced by the playback device. In many embodiments, switching between streams is facilitated by separately pre-encoding discrete portions of the source media in accordance with the encoding parameters of each stream and then including each separately encoded portion in its own Cluster element within the stream's container file. Furthermore, the media contained within each cluster is encoded so that the media is capable of playback without reference to media contained in any other cluster within the stream. In this way, each stream includes a Cluster element corresponding to the same discrete portion of the source media and, at any time, the playback device can select the Cluster element from the stream that is most appropriate to the streaming conditions experienced by the playback device and can commence playback of the media contained within the Cluster element. Accordingly, the playback device can select clusters from different streams as the streaming conditions experienced by the playback device change over time. In several embodiments, the Cluster elements are further constrained so that each Cluster element contains a portion of encoded media from the source media having the same duration. In a number of embodiments, each Cluster element includes two seconds of encoded media. The specific constraints applied to the media encoded within each Cluster element depending upon the type of media (i.e. video, audio, or subtitles) are discussed below.

Figures 4A, 4B:
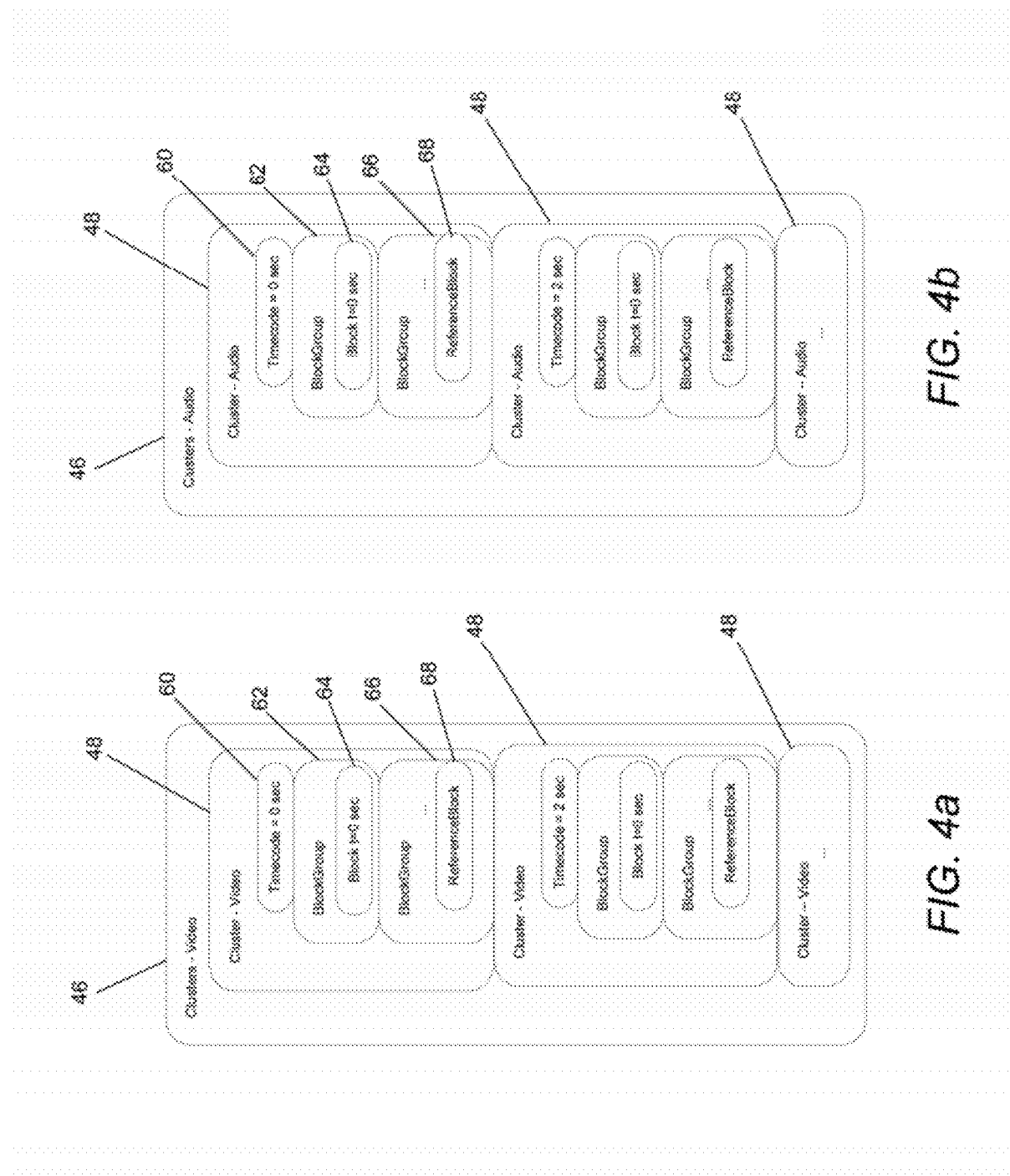
FIGS. 4a-4c conceptually illustrate the insertion of different types of media into the Clusters element of a Matroska container file subject to various constrains that facilitate adaptive bitrate streaming in accordance with embodiments of the invention.

A Clusters element of a Matroska container file containing a video stream in accordance with an embodiment of the invention is illustrated in FIG. 4a. The Clusters element 46 includes a plurality of Cluster elements 48 that each contains a discrete portion of encoded video. In the illustrated embodiment, each Cluster element 48 includes two seconds of encoded video. In other embodiments, the Cluster elements include encoded video having a greater or lesser duration than two seconds. The smaller the Cluster elements (i.e. the smaller the duration of the encoded media within each Cluster element), the higher the overhead associated with requesting each Cluster element. Therefore, a tradeoff exists between the responsiveness of the playback device to changes in streaming conditions and the effective data rate of the adaptive streaming system for a given set of streaming conditions (i.e. the portion of the available bandwidth actually utilized to transmit encoded media). In several embodiments, the encoded video sequences in the Cluster elements have different durations. Each Cluster element 48 includes a Timecode element 60 indicating the start time of the encoded video within the Cluster element and a plurality of BlockGroup elements. As noted above, the encoded video stored within the Cluster is constrained so that the encoded video can be played back without reference to the encoded video contained within any of the other Cluster elements in the container file. In many embodiments, encoding the video contained within the Cluster element as a GOP in which the first frame is an IDR frame enforces the constraint. In the illustrated embodiment, the first BlockGroup element 62 contains an IDR frame. Therefore, the first BlockGroup element 62 does not include a ReferenceBlock element. The first BlockGroup element 62 includes a Block element 64, which specifies the Timecode attribute of the frame encoded within the Block element 64 relative to the Timecode of the Cluster element 48. Subsequent BlockGroup elements 66 are not restricted in the types of frames that they can contain (other than that they cannot reference frames that are not contained within the Cluster element). Therefore, subsequent BlockGroup elements 66 can include ReferenceBlock elements 68 referencing other BlockGroup element(s) utilized in the decoding of the frame contained within the BlockGroup or can contain IDR frames and are similar to the first BlockGroup element 62. As noted above, the manner in which encoded video is inserted within the Cluster elements of the Matroska file conforms with the specification of the Matroska file format.

Figure 4D:
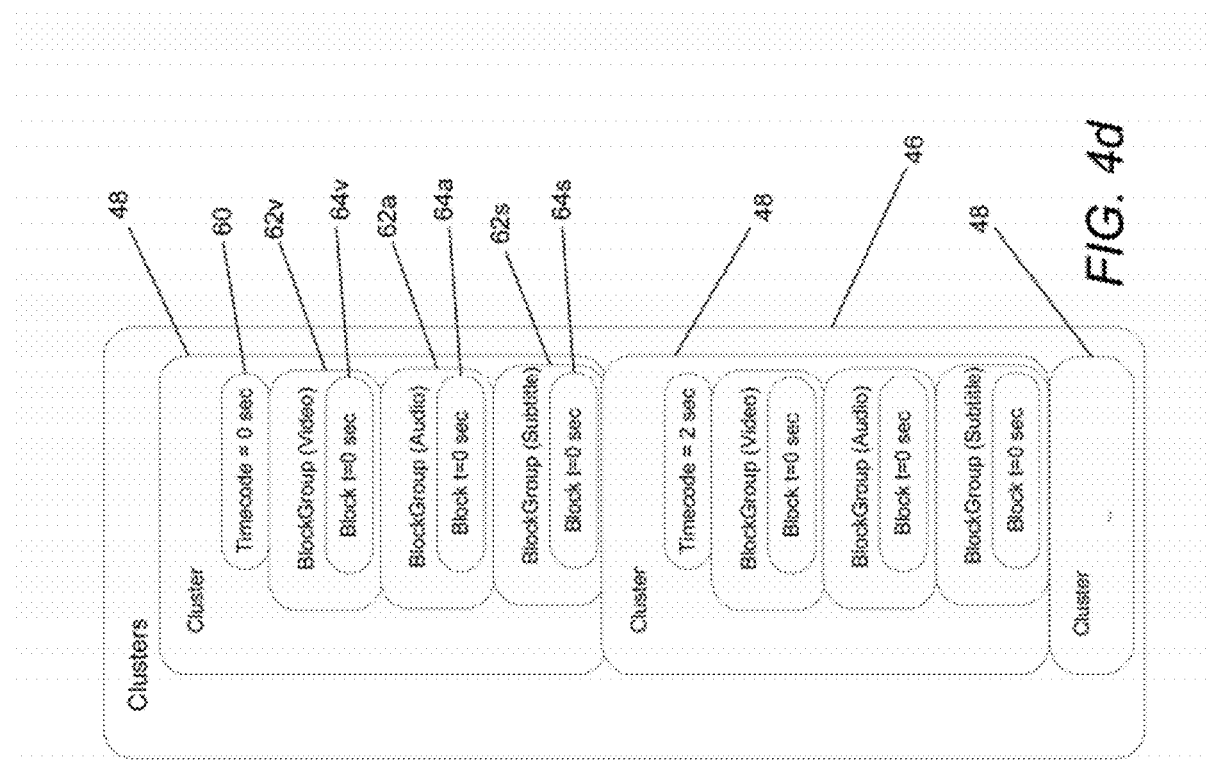
FIG. 4d conceptually illustrates, the multiplexing of different types of media into the Clusters element of a Matroska container file subject to various constraints that facilitate adaptive bitrate streaming in accordance with an embodiment of the invention.
Figure 4C:
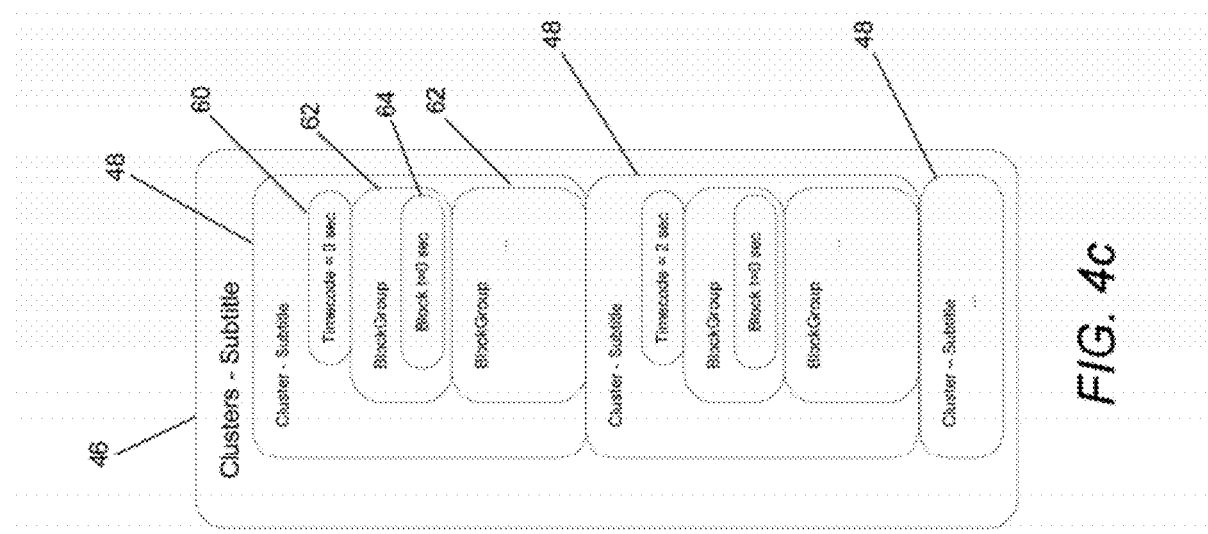

The insertion of encoded audio and subtitle information within a Clusters element 46 of a Matroska container file in accordance with embodiments of the invention is illustrated in FIGS. 4b and 4c. In the illustrated embodiments, the encoded media is inserted within the Cluster elements 48 subject to the same constraints applied to the encoded video discussed above with respect to FIG. 4a. In addition, the duration of the encoded audio and subtitle information within each Cluster element corresponds to the duration of the encoded video in the corresponding Cluster element of the Matroska container file containing the encoded video. In other embodiments, the Cluster elements within the container files containing the audio and/or subtitle streams need not correspond with the start time and duration of the Cluster elements in the container files containing the alternative video streams.

Muliplexing Streams in a Single MKV Container File

The Clusters elements shown in FIGS. 4a-c assume that a single stream is contained within each Matroska container file. In several embodiments, media from multiple streams is multiplexed within a single Matroska container file. In this way, a single container file can contain a video stream multiplexed with one or more corresponding audio streams, and/or one or more corresponding subtitle streams. Storing the streams in this way can result in duplication of the audio and subtitle streams across multiple alternative video streams. However, the seek time to retrieve encoded media from a video stream and an associated audio, and/or subtitle stream can be reduced due to the adjacent storage of the data on the server. The Clusters element 46 of a Matroska container file containing multiplexed video, audio and subtitle data in accordance with an embodiment of the invention is illustrated in FIG. 4d. In the illustrated embodiment, each Cluster element 48 includes additional BlockGroup elements for each of the multiplexed streams. The first Cluster element includes a first BlockGroup element 62v for encoded video that includes a Block element 64v containing an encoded video frame and indicating the Timecode attribute of the frame relative to the start time of the Cluster element (i.e. the Timecode attribute 60). A second BlockGroup element 62a includes a Block element 64a including an encoded audio sequence and indicating the timecode of the encoded audio relative to the start time of the Cluster element, and a third BlockGroup element 62s including a Block element 64s containing an encoded subtitle and indicating the timecode of the encoded subtitle relative to the start time of the Cluster element. Although not shown in the illustrated embodiment, each Cluster element 48 likely would include additional BlockGroup elements containing additional encoded video, audio or subtitles. Despite the multiplexing of the encoded video, audio, and/or subtitle streams, the same constraints concerning the encoded media apply.

Incorporating Trick Play Tracks in MKV Container Files for Use in Adaptive Bitrate Streaming Systems The incorporation of trick play tracks within Matroska container files is proposed by DivX, LLC in U.S. patent application Ser. No. 12/260,404 entitled "Application Enhancement Tracks", filed Oct. 29, 2008, the disclosure of which is hereby incorporated by reference in its entirety. Trick play tracks similar to the trick play tracks described in U.S. patent application Ser. No. 12/260,404 can be used to provide a trick play stream in an adaptive bitrate streaming system in accordance with an embodiment of the invention to provide smooth visual search through source content encoded for adaptive bitrate streaming. A separate trick play track can be encoded that appears to be an accelerated visual search through the source media when played back, when in reality the trick play track is simply a separate track encoding the source media at a lower frame rate. In several embodiments, the tick play stream is created by generating a trick play track in the manner outlined in U.S. patent application Ser. No. 12/260,404 and inserting the trick play track into a Matroska container file subject to the constraints mentioned above with respect to insertion of a video stream into a Matroksa container file. In many embodiments, the trick play track is also subject to the further constraint that every frame in the GOP of each Cluster element in the trick play track is encoded as an IDR frame. As with the other video streams, each Cluster element contains a GOP corresponding to the same two seconds of source media as the corresponding Cluster elements in the other streams. There are simply fewer frames in the GOPs of the trick play track and each frame has a longer duration. In this way, transitions to and from a trick play stream can be treated in the same way as transitions between any of the other encoded streams are treated within an adaptive bitrate streaming system in accordance with embodiments of the invention. Playback of the frames contained within the trick play track to achieve accelerated visual search typically involves the playback device manipulating the timecodes assigned to the frames of encoded video prior to providing the frames to the playback device's decoder to achieve a desired increase in rate of accelerated search (e.g. ×2, ×4, ×6, etc.).

Figure 4E:
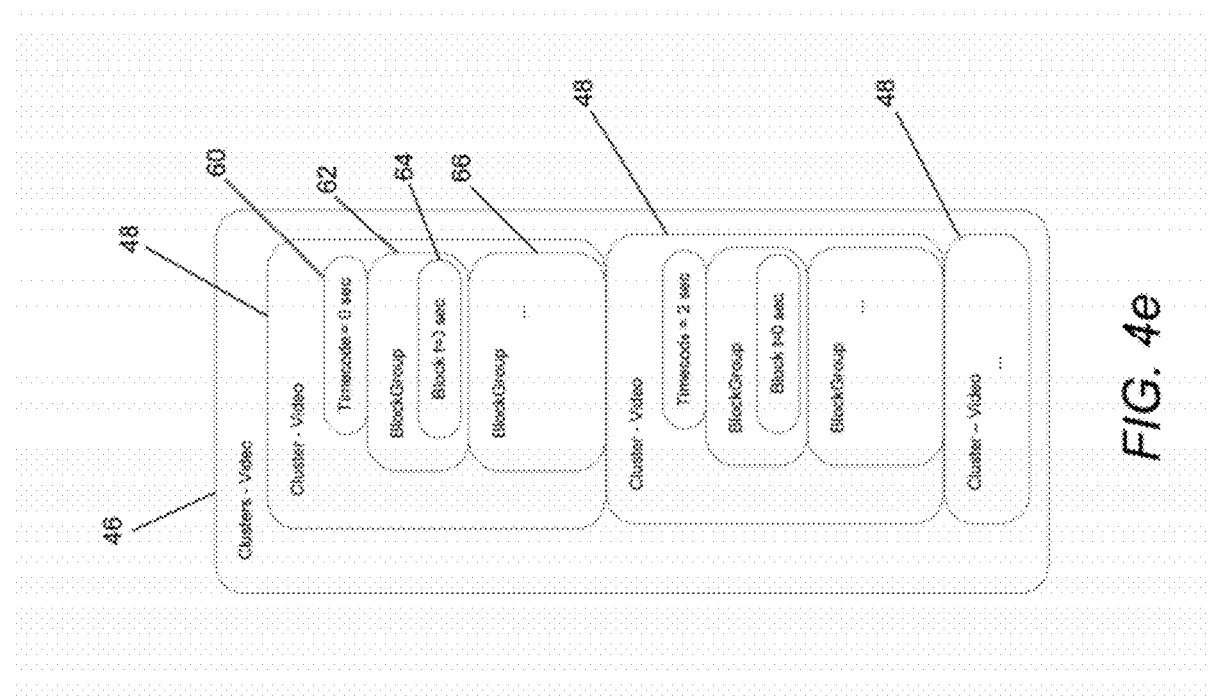
FIG. 4e conceptually illustrates the inclusion of a trick play track into the Clusters element of a Matroska container file subject to various constraints that facilitate adaptive bitrate streaming in accordance with an embodiment of the invention.

A Clusters element containing encoded media from a trick play track is shown in FIG. 4e. In the illustrated embodiment, the encoded trick play track is inserted within the Cluster elements 48 subject to the same constraints applied to the encoded video discussed above with respect to FIG. 4a. However, each Block element contains an IDR. In other embodiments, the Cluster elements within the container files containing the trick play tracks need not correspond with the start time and duration of the Cluster elements in the container files containing the alternative video streams.

In many embodiments, source content can be encoded to provide a single trick play track or multiple trick play tracks for use by the adaptive bit rate streaming system. When a single trick play track is provided, the trick play track is typically encoded at a low bitrate. When multiple alternative trick play tracks are provided, adaptive rate streaming can also be performed with respect to the trick play tracks. In several embodiments, multiple trick play tracks are provided to support different rates of accelerated visual search through the encoded media.

Incorporating Indexing Information within MKV Container Files

Figure 5:
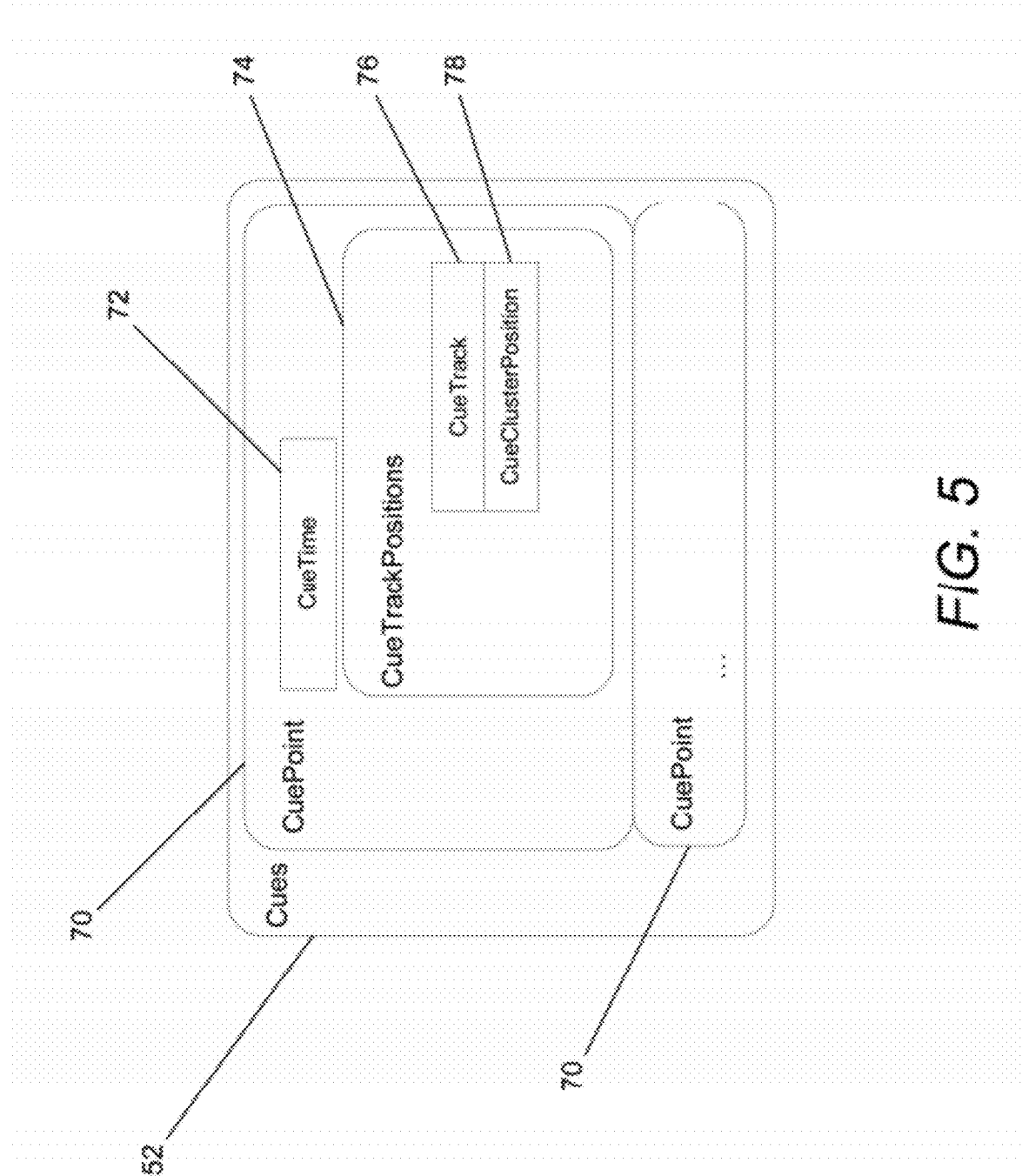
FIG. 5 conceptually illustrates a modified Cues element of a specialized Matroska container file, where the Cues element includes information enabling the retrieval of Cluster elements using HTTP byte range requests in accordance with an embodiment of the invention.

The specification for the Matroska container file format provides for an optional Cues element that is used to index Block elements within the container file. A modified Cues element 52 that can be incorporated into a Matroska container file in accordance with an embodiment of the invention to facilitate the requesting of clusters by a playback device using HTTP is illustrated in FIG. 5. The modified Cues element 52 includes a plurality of CuePoint elements 70 that each include a CueTime attribute 72. Each CuePoint element includes a CueTrackPositions element 74 containing the CueTrack 76 and CueClusterPosition 78 attributes. In many embodiments, the CuePoint element is mainly configured to identify a specific Cluster element as opposed to a specific Block element within a Cluster element. Although, in several applications the ability to seek to specific BlockGroup elements within a Cluster element is required and additional index information is included in the Cues element.

Figure 6:
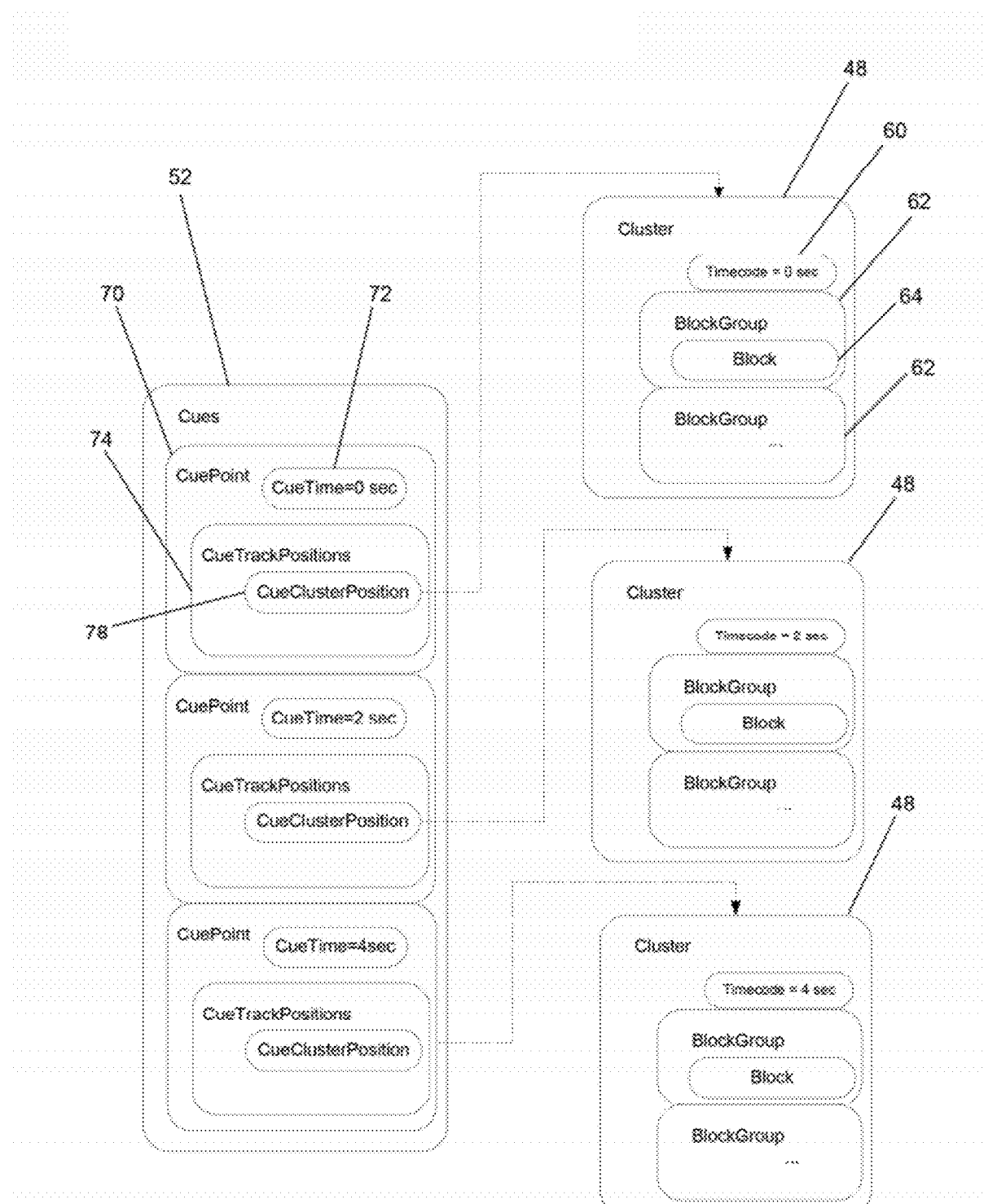
FIG. 6 conceptually illustrates the indexing of Cluster elements within a specialized Matroska container file utilizing modified CuePoint elements within the container file in accordance with embodiments of the invention.

The use of a modified Cues element to index encoded media within a Clusters element of a Matroska file in accordance with an embodiment of the invention is illustrated in FIG. 6. A CuePoint element is generated to correspond to each Cluster element within the Matroska container file. The CueTime attribute 72 of the CuePoint element 70 corresponds to the Timecode attribute 60 of the corresponding Cluster element 48. In addition, the CuePoint element contains a CueTrackPositions element 74 having a CueClusterPosition attribute 78 that points to the start of the corresponding Cluster element 48. The CueTrackPositions element 74 can also include a CueBlockNumber attribute, which is typically used to indicate the Block element containing the first IDR frame within the Cluster element 48.

As can readily be appreciated the modified Cues element 52 forms an index to each of the Cluster elements 48 within the Matroska container file. Furthermore, the CueTrackPosition elements provide information that can be used by a playback device to request the byte range of a specific Cluster element 48 via HTTP or another suitable protocol from a remote server. The Cues element of a conventional Matroska file does not directly provide a playback device with information concerning the number of bytes to request from the start of the Cluster element in order to obtain all of the encoded video contained within the Cluster element. The size of a Cluster element can be inferred in a modified Cues element by using the CueClusterPosition attribute of the CueTrackPositions element that indexes the first byte of the next Cluster element. Alternatively, additional CueTrackPosition elements could be added to modified Cues elements in accordance with embodiments of the invention that index the last byte of the Cluster element (in addition to the CueTrackPositions elements that index the first byte of the Cluster element), and/or a non-standard CueClusterSize attribute that specifies the size of the Cluster element pointed to by the CueClusterPosition attribute is included in each CueTrackPosition element to assist with the retrieval of specific Cluster elements within a Matroska container file via HTTP byte range requests or a similar protocol.

The modification of the Cues element in the manner outlined above significantly simplifies the retrieval of Cluster elements from a Matroska container file via HTTP or a similar protocol during adaptive bitrate streaming. In addition, by only indexing the first frame in each Cluster the size of the index is significantly reduced. Given that the index is typically downloaded prior to playback, the reduced size of the Cues element (i.e. index) means that playback can commence more rapidly. Using the CueClusterPosition elements, a playback device can request a specific Cluster element from the stream most suited to the streaming conditions experienced by the playback device by simply referencing the index of the relevant Matroska container file using the Timecode attribute for the desired Cluster element.

Figure 5A:
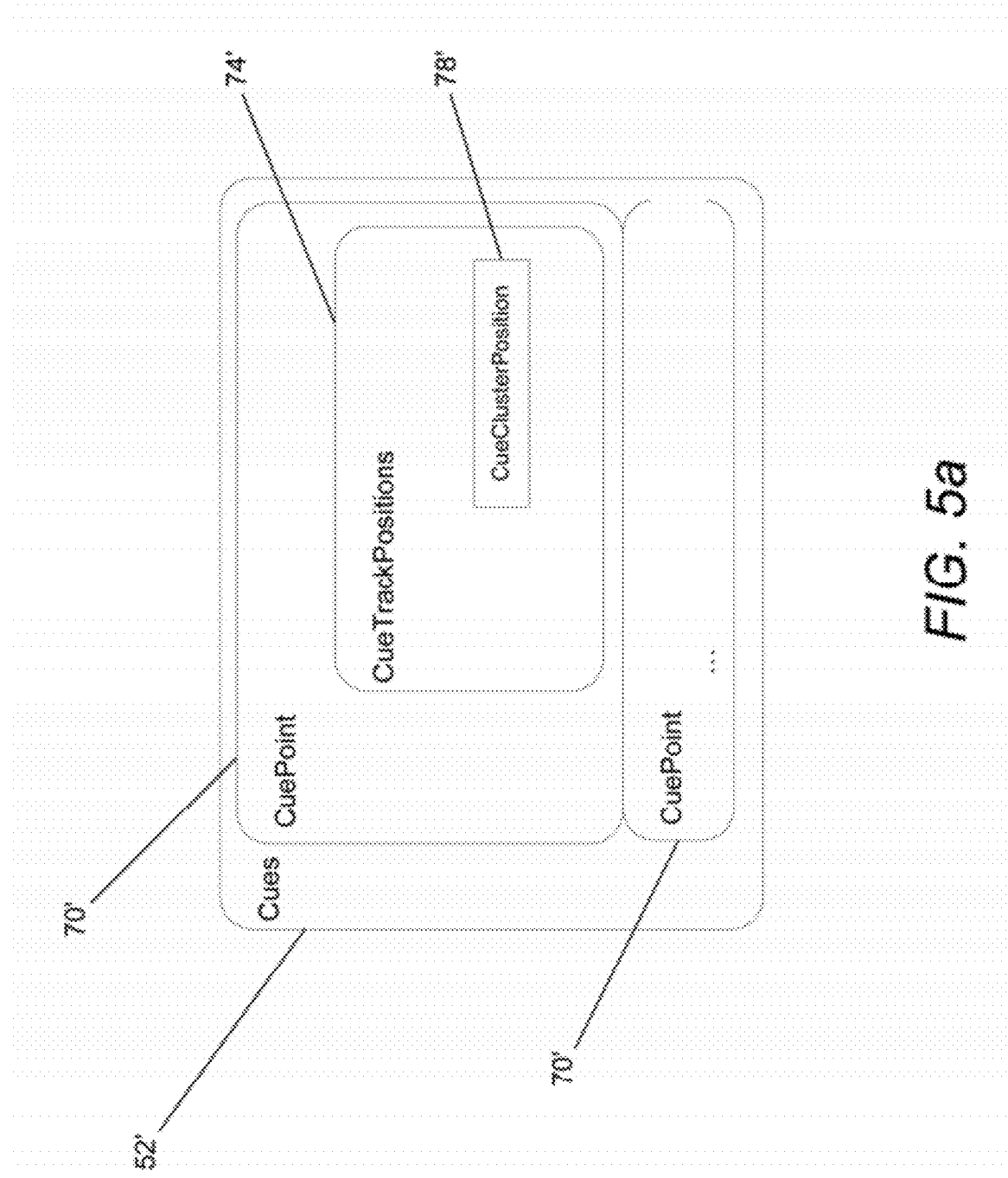
FIG. 5a conceptually illustrates a modified Cues element of a specialized Matroska container file in accordance with an embodiment of the invention, where the Cues element is similar to the Cues element shown in FIG. 5 with the exception that attributes that are not utilized during adaptive bitrate streaming are removed.

In some embodiments, a number of the attributes within the Cues element are not utilized during adaptive bitrate streaming. Therefore, the Cues element can be further modified by removing the unutilized attributes to reduce the overall size of the index for each Matroska container file. A modified Cues element that can be utilized in a Matroska container file that includes a single encoded) stream in accordance with an embodiment of the invention is illustrated in FIG. 5a. The Cues element 52' shown in FIG. 5a is similar to the Cues element 52 shown in FIG. 5 with the exception that the CuePoint elements 70' do not include a CueTime attribute (see 72 in FIG. 5) and/or the CueTrackPositions elements 74' do not include a CueTrack attribute (76 in FIG. 5). When the portions of encoded media in each Cluster element in the Matroska container file have the same duration, the CueTime attribute is not necessary. When the Matroska contain file includes a single encoded stream, the CueTrack attribute is not necessary. In other embodiments, the Cues element and/or other elements of the Matroska container file can be modified to remove elements and/or attributes that are not necessary for the adaptive bitrate streaming of the encoded stream contained within the Matroska container file, given the manner in which the stream is encoded and inserted in the Matroska container file.

Although various modifications to the Cues element to include information concerning the size of each of the Cluster elements within a Matroska container file and to eliminate unnecessary attributes are described above, many embodiments of the invention utilize a conventional Matroska container. In several embodiments, the playback device simply determines the size of Cluster elements on the fly using information obtained from a conventional Cues element, and/or, relies upon a separate index file containing information concerning the size and/or location of the Cluster elements within the MKV container file. In several embodiments, the additional index information is stored in the top level index file. In a number of embodiments, the additional index information is stored in separate files that are identified in the top level index file. When index information utilized to retrieve Cluster elements from a Matroska container file is stored separately from the container file, the Matroska container file is still typically constrained to encode media for inclusion in the Cluster elements in the manner outlined above. In addition, wherever the index information is located, the index information will typically index each Cluster element and include (but not be limited to) information concerning at least the starting location and, in many instances, the size of each Cluster element.

Encoding Source Media for Adaptive Bitrate Streaming

Figure 7:
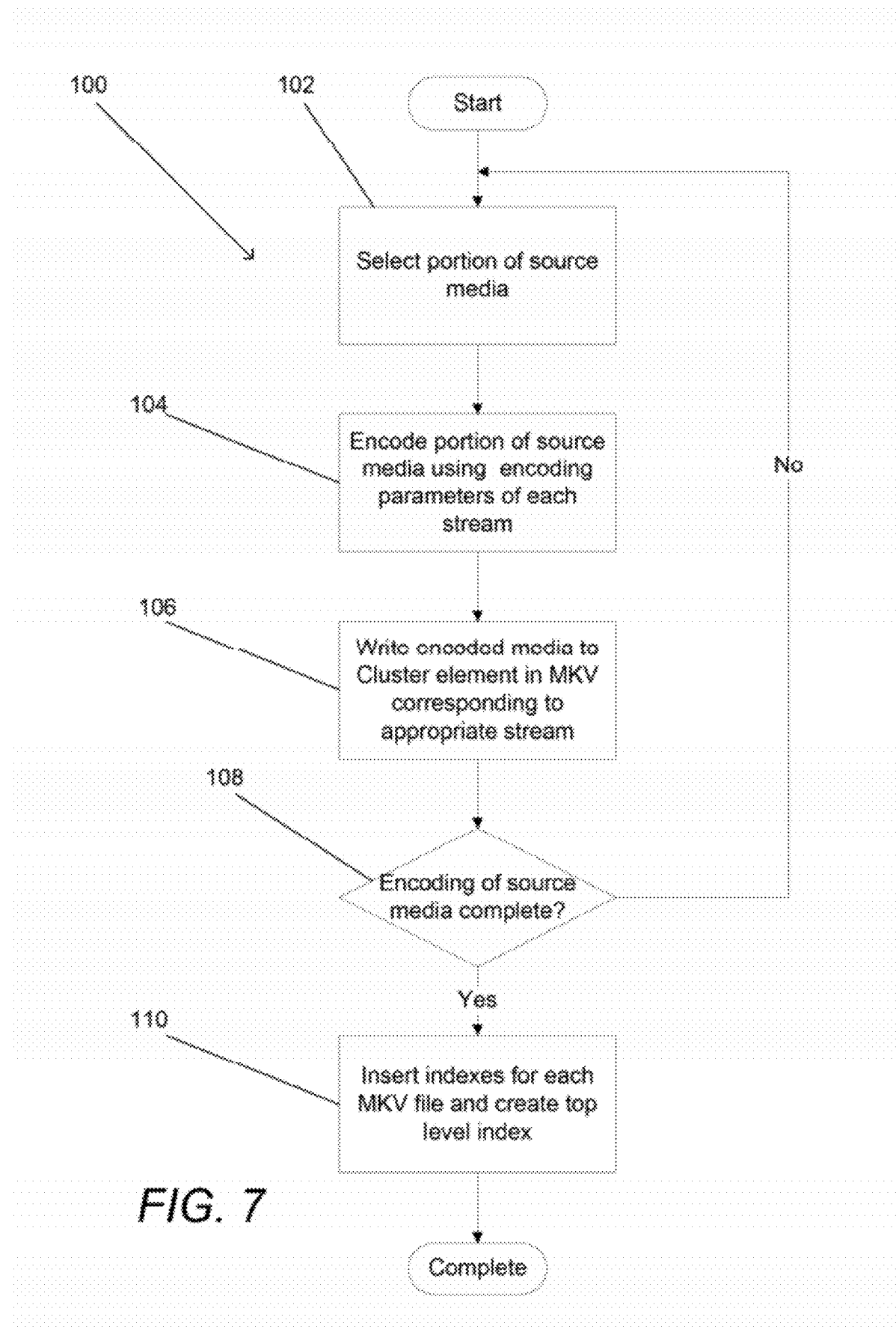
FIG. 7 is a flow chart illustrating a process for encoding source media for adaptive bitrate streaming in accordance with an embodiment of the invention.

A process for encoding source media as a top level index file and a, plurality of Matroska container files for use in an adaptive bitrate streaming system in accordance with an embodiment of the invention is illustrated in FIG. 7. The encoding process 100 commences by selecting (102) a first portion of the source media and encoding (104) the source media using the encoding parameters for each stream. When the portion of media is video, then the portion of source video is encoded as a single GOP commencing with an IDR frame. In many embodiments, encoding parameters used to create the alternative GOPs vary based upon bitrate, frame rate, encoding parameters and resolution. In this way, the portion of media is encoded as a set of interchangeable alternatives and a playback device can select the alternative most appropriate to the streaming conditions experienced by the playback device. When different resolutions are supported, the encoding of the streams is constrained so that each stream has the same display aspect ratio. A constant display aspect ratio can be achieved across different resolution streams by varying the sample aspect ratio with the resolution of the stream. In many instances, reducing resolution can result in higher quality video compared with higher resolution video encoded at the same bit rate. In many embodiments, the source media is itself encoded and the encoding process (104) involves transcoding or transrating of the encoded source media according to the encoding parameters of each of the alternative streams supported by the adaptive bitrate streaming system.

Once the source media has been encoded as a set of alternative portions of encoded media, each of the alternative portions of encoded media is inserted (106) into a Cluster element within the Matroska container file corresponding to the stream to which the portion of encoded media belongs. In many embodiments, the encoding process also constructs indexes for each Matroska container file as media is inserted into Cluster elements within the container. Therefore, the process 100 can also include creating a CuePoint element that points to the Cluster element inserted within the Matroska container file. The CuePoint element can be held in a buffer until the source media is completely encoded. Although the above process describes encoding each of the alternative portions of encoded media sequentially in a single pass through the source media, many embodiments of the invention involve performing a separate pass through the source media to encode each of the alternative streams.

Referring back to FIG. 7, the process continues to select (102) and encode (104) portions of the source media and then insert (106) the encoded portions of media into the Matroska container file corresponding to the appropriate stream until the entire source media is encoded for adaptive bitrate streaming (108). At which point, the process can insert an index (110) into the Matroska container for each stream and create (112) a top level index file that indexes each of the encoded streams contained within the Matroska container files. As noted above, the indexes can be created as encoded media and inserted into the Matroska container files so that a CuePoint element indexes each Cluster element within the Mastroska container file. Upon completion of the encoding, each of the CuePoint elements can be included in a Cues element and the Cues element can be inserted into the Matroska container file following the Clusters element.

Following the encoding of the source media to create Matroska container files containing each of the streams generated during the encoding process, which can include the generation of trick play streams, and a top level index file that indexes each of the streams within the Matroska container files, the top level index file and the Matroska container files can be uploaded to an HTTP server for adaptive bitrate streaming to playback devices. The adaptive bitrate streaming of media encoded in accordance with embodiments of the invention using HTTP requests is discussed further below.

Adaptive Bitrate Streaming from MKV Container Files Using Http

When source media is encoded so that there are alternative streams contained in separate Matroska container files for at least one of video, audio, and subtitle content, adaptive streaming of the media contained within the Matroska container files can be achieved using HTTP requests or a similar stateless data transfer protocol. In many embodiments, a playback device requests the top level index file resident on the server and uses the index information to identify the streams that are available to the playback device. The playback device can then retrieve the indexes for one or more of the Matroska files and can use the indexes to request media from one or more of the streams contained within the Matroska container files using HTTP requests or using a similar stateless protocol. As noted above, many embodiments of the invention implement the indexes for each of the Matroska container files using a modified Cues element. In a number of embodiments, however, the encoded media for each stream is contained within a standard Matroska container file and separate index file(s) can also be provided for each of the container files. Based upon the streaming conditions experienced by the playback device, the playback device can select media from alternative streams encoded at different bitrates. When the media from each of the streams is inserted into the Matroska container file in the manner outlined above, transitions between streams can occur upon the completion of playback of media within a Cluster element. Therefore, the size of the Cluster elements (i.e the duration of the encoded media within the Cluster elements) is typically chosen so that the playback device is able to respond quickly enough to changing streaming conditions and to instructions from the user that involve utilization of a trick play track. The smaller the Cluster elements (i.e. the smaller the duration of the encoded media within each Cluster element), the higher the overhead associated with requesting each Cluster element. Therefore, a tradeoff exists between the responsiveness of the playback device to changes in streaming conditions and the effective data rate of the adaptive streaming system for a given set of streaming conditions (i.e. the portion of the available bandwidth actually utilized to transmit encoded media). In many embodiments, the size of the Cluster elements is chosen so that each Cluster element contains two seconds of encoded media. In other embodiments, the duration of the encoded media can be greater or less than two seconds and/or the duration of the encoded media can vary from Cluster element to Cluster element.

Figure 8:
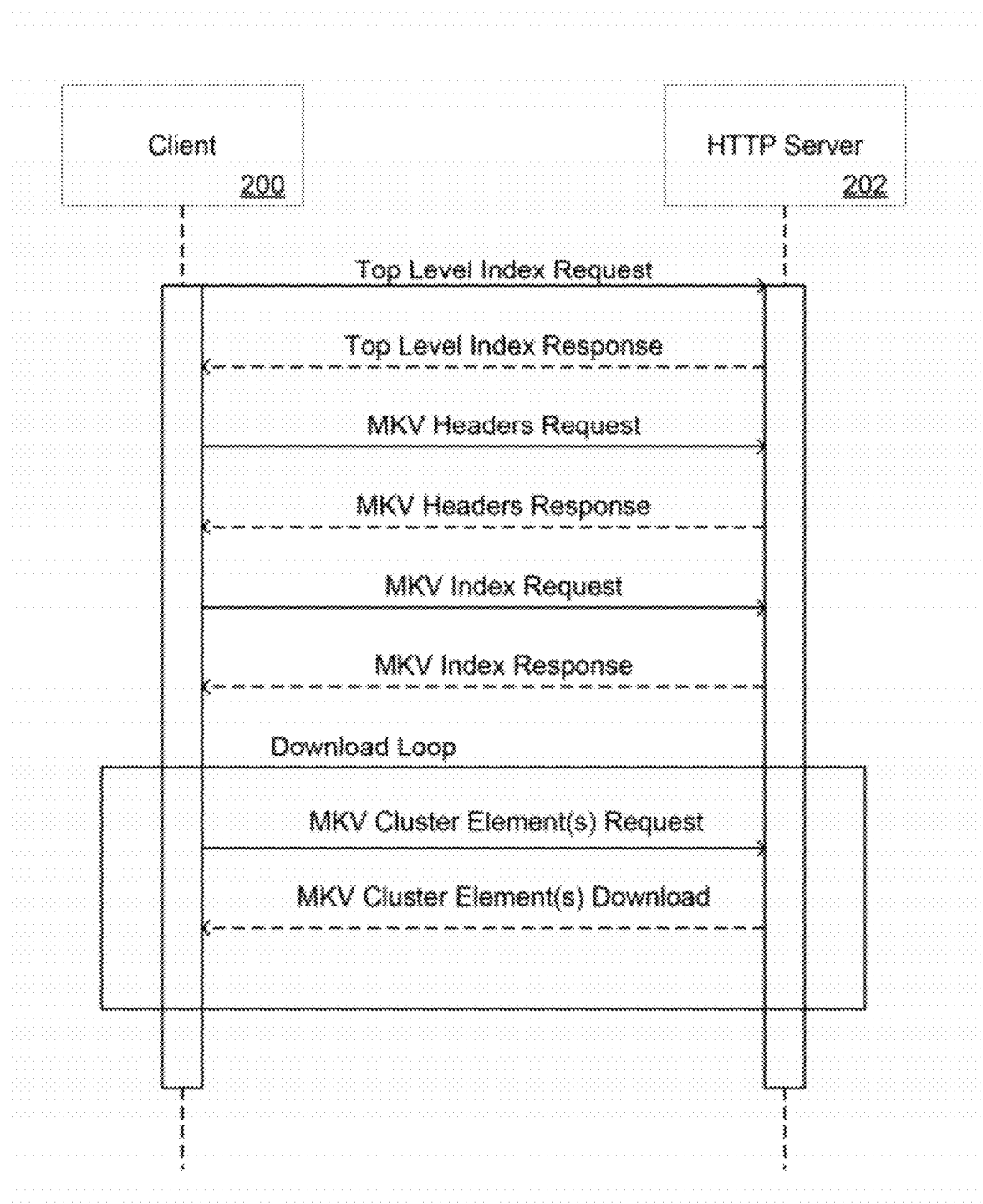
FIG. 8 conceptually illustrates communication between a playback device and an HTTP server associated with the commencement of streaming of encoded media contained within Matroska container files indexed by a top level index file in accordance with an embodiment of the invention.

Communication between a playback device or client and an HTTP server during the playback of media encoded in separate streams contained within Matroska container files indexed by a top level index file in accordance with an embodiment of the invention is illustrated in FIG. 8. In the illustrated embodiment, the playback device 200 commences playback by requesting the top level index file from the server 202 using an HTTP request or a similar protocol for retrieving data. The server 202 provides the bytes corresponding to the request. The playback device 200 then parses the top level index file to identify the URIs of each of the Matroska container files containing the streams of encoded media derived from a specific piece of source media. The playback device can then request the byte ranges corresponding to headers of one or more of the Matroska container files via HTTP or a similar protocol, where the byte ranges are determined using the information contained in the URI for the relevant Matroska container files (see discussion above). The server returns the following information in response to a request for the byte range containing the headers of a Matroska container file:

ELEM("EBML")
    ELEM("SEEKHEAD")
    ELEM("SEGMENTINFO")
    ELEM("TRACKS")

The EBML element is typically processed by the playback device to ensure that the file version is supported. The SeekHead element is parsed to find the location of the Matroska index elements and the SegmentInfo element contains two key elements utilized in playback: TimecodeScale and Duration. The TimecodeScale specifies the timecode scale for all timecodes within the Segment of the Matroska container file and the Duration specifies the duration of the Segment based upon the TimecodeScale. The Tracks element contains the information used by the playback device to decode the encoded media contained within the Clusters element of the Matroska file. As noted above, adaptive bitrate streaming systems in accordance with embodiments of the invention can support different streams encoded using different encoding parameters including but not limited to frame rate, and resolution. Therefore, the playback device can use the information contained within the Matroska container file's headers to configure the decoder every time a transition is made between encoded streams.

In many embodiments, the playback device does not retrieve the headers for all of the Matroska container files indexed in the top level index file. Instead, the playback device determines the stream(s) that will be utilized to initially commence playback and requests the headers from the corresponding Matroska container files. Depending upon the structure of the URIs contained within the top level index file, the playback device can either use information from the URIs or information from the headers of the Matroska container files to request byte ranges from the server that contain at least a portion of the index from relevant Matroska container files. The byte ranges can correspond to the entire index. The server provides the relevant byte ranges containing the index information to the playback device, and the playback device can use the index information to request the byte ranges of Cluster elements containing encoded media using this information. When the Cluster elements are received, the playback device can extract encoded media from the Block elements within the Cluster element, and can decode and playback the media within the Block elements in accordance with their associated Timecode attributes.

In the illustrated embodiment, the playback device 200 requests sufficient index information from the HTTP server prior to the commencement of playback that the playback device can stream the entirety of each of the selected streams using the index information. In other embodiments, the playback device continuously retrieves index information as media is played back. In several embodiments, all of the index information for the lowest bitrate steam is requested prior to playback so that the index information for the lowest bitrate stream is available to the playback device in the event that streaming conditions deteriorate rapidly during playback.

Switching Between Streams

The communications illustrated in FIG. 8 assume that the playback device continues to request media from the same streams (i.e. Matroska container files) throughout playback of the media. In reality, the streaming conditions experienced by the playback device are likely to change during the playback of the streaming media and the playback device can request media from alternative streams (i.e. different Matroska container files) to provide the best picture quality for the streaming conditions experienced by the playback device. In addition, the playback device may switch streams in order to perform a trick play function that utilizes a trick play track stream.

Figure 9A:
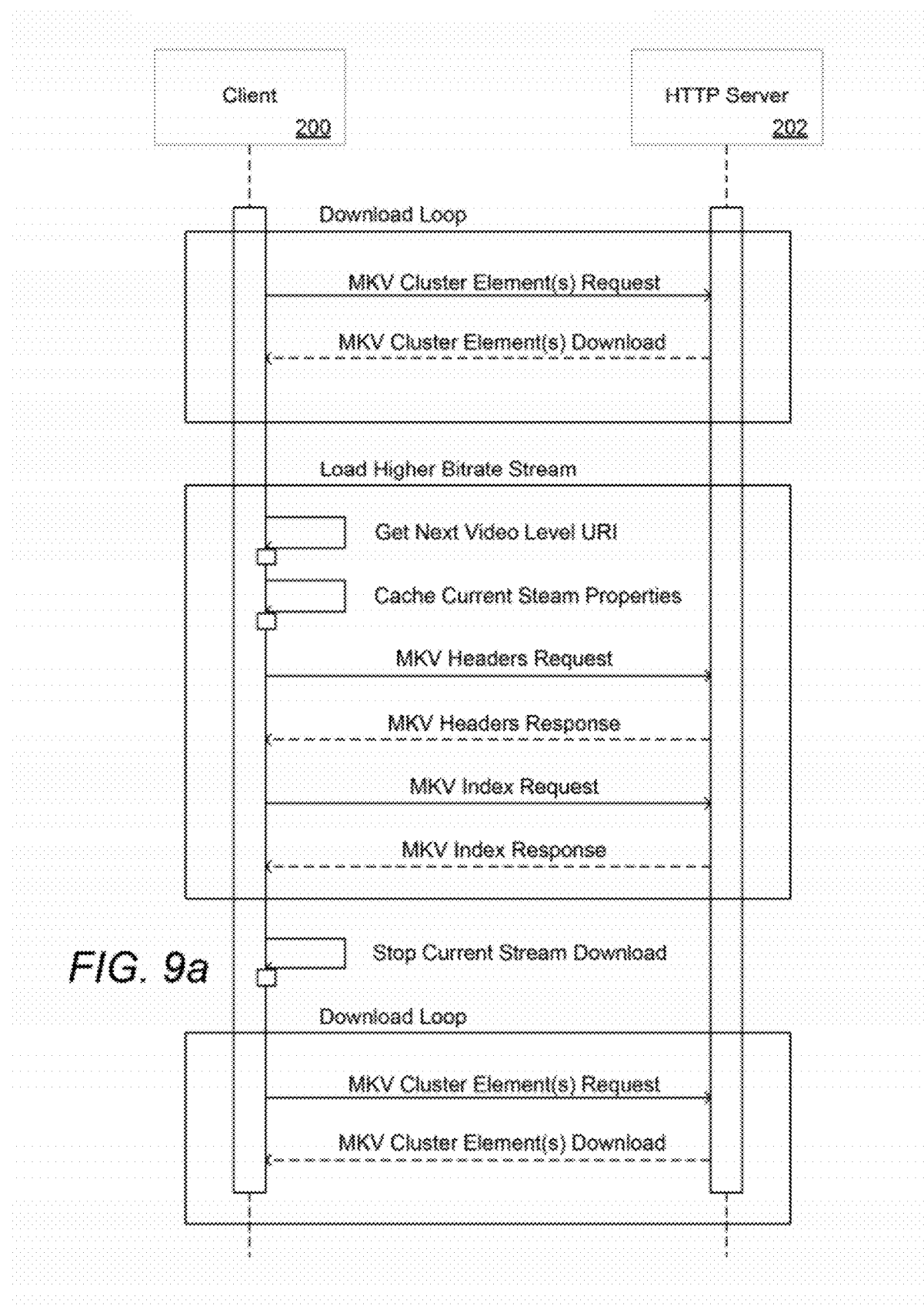
FIGS. 9a and 9b conceptually illustrate communication between a playback device and an HTTP server associated with switching between streams in response to the streaming conditions experienced by the playback device and depending upon the index information available to the playback device prior to the decision to switch streams in accordance with embodiments of the invention.

Communication between a playback device and a server when a playback device switches to a new stream in accordance with embodiments of the invention are illustrated in FIG. 9a. The communications illustrated in FIG. 9a assume that the index information for the new stream has not been previously requested by the playback device and that downloading of Cluster elements from the old stream proceeds while information is obtained concerning the Matroska container file containing the new stream. When the playback device 200 detects a change in streaming conditions, determines that a higher bitrate stream can be utilized at the present streaming conditions, or receives a trick play instruction from a user, the playback device can use the top level index file to identify the URI for a more appropriate alternative stream to at least one of the video, audio, or subtitle streams from which the playback device is currently requesting encoded media. The playback device can save the information concerning the current stream(s) and can request the byte ranges of the headers for the Matroska container file(s) containing the new stream(s) using the parameters of the corresponding URIs. Caching the information in this way can be beneficial when the playback device attempts to adapt the bitrate of the stream downward. When the playback device experiences a reduction in available bandwidth, the playback device ideally will quickly switch to a lower bitrate stream. Due to the reduced bandwidth experienced by the playback device, the playback device is unlikely to have additional bandwidth to request header and index information. Ideally, the playback device utilizes all available bandwidth to download already requested higher rate Cluster elements and uses locally cached index information to start requesting Cluster elements from Matroska container file(s) containing lower bitrate stream(s).

Byte ranges for index information for the Matroska container file(s) containing the new stream(s) can be requested from the HTTP server 202 in a manner similar to that outlined above with respect to FIG. 8. At which point, the playback device can stop downloading of cluster elements from the previous streams and can commence requesting the byte ranges of the appropriate Cluster elements from the Matroska container file(s) containing the new stream(s) from the HTTP server, using the index information from the Matroska container file(s) to identify the Cluster element(s) containing the encoded media following the encoded media in the last Cluster element retrieved by the playback device. As noted above, the smooth transition from one stream to another is facilitated by encoding each of the alternative streams so that corresponding Cluster elements start with the same Timecode element and an IDR frame.

Figure 9B:
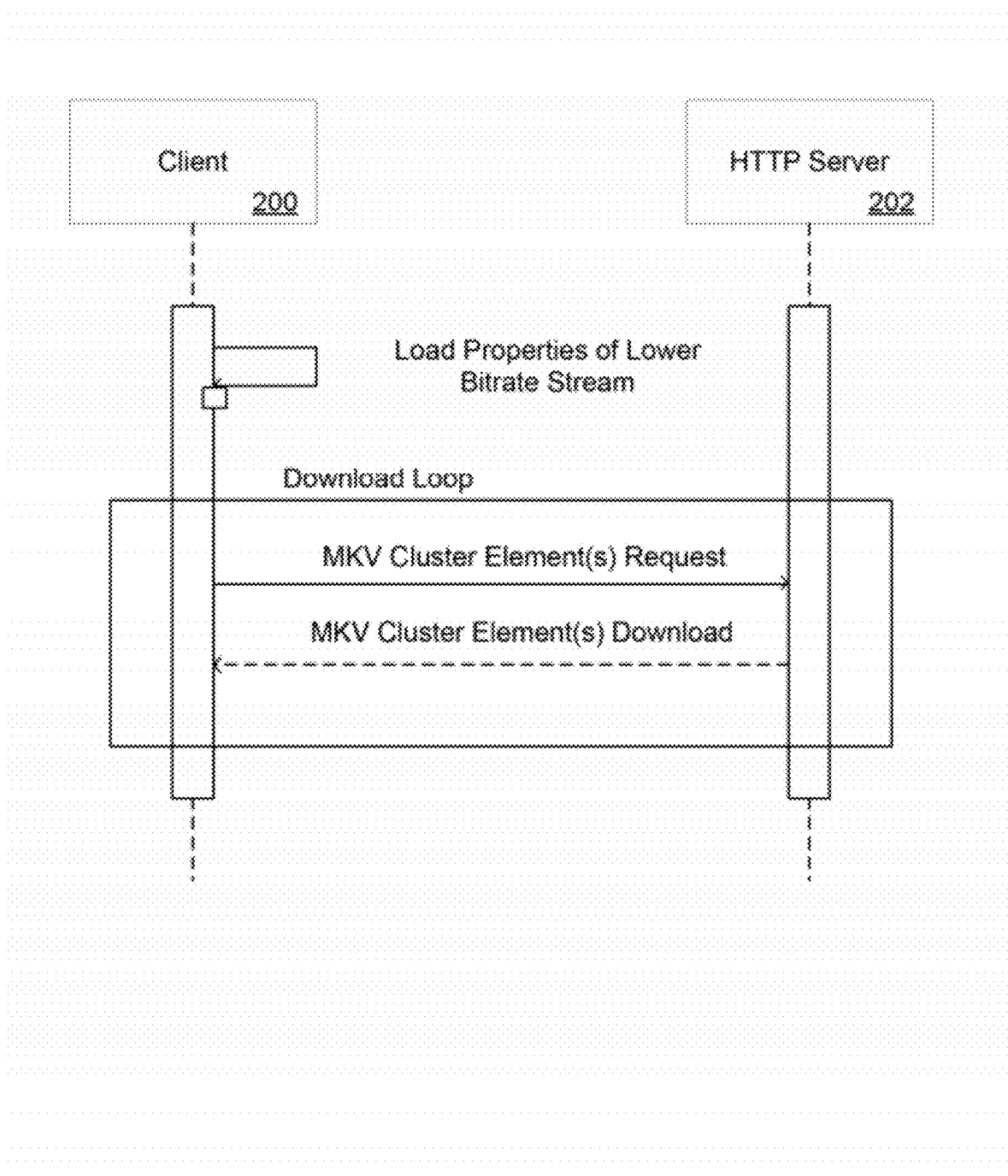

When the playback device caches the header and the entire index for each stream that has be utilized in the playback of the media, the process of switching back to a previously used stream can be simplified. The playback device already has the header and index information for the Matroska file containing the previously utilized stream and the playback device can simply use this information to start requesting Cluster elements from the Matroska container file of the previously utilized stream via HTTP. Communication between a playback device and an HTTP server when switching back to a stream(s) for which the playback device has cached header and index information in accordance with an embodiment of the invention is illustrated in FIG. 9b. The process illustrated in FIG. 9b is ideally performed when adapting bitrate downwards, because a reduction in available resources can be exacerbated by a need to download index information in addition to media. The likelihood of interruption to playback is reduced by increasing the speed with which the playback device can switch between streams and reducing the amount of overhead data downloaded to achieve the switch.

Although the present invention has been described in certain specific aspects, many additional modifications and variations would be apparent to those skilled in the art. It is therefore to be understood that the present invention may be practiced otherwise than specifically described, including various changes in the implementation such as utilizing encoders and decoders that support features beyond those specified within a particular standard with which they comply, without departing from the scope and spirit of the present invention. Thus, embodiments of the present invention should be considered in all respects as illustrative and not restrictive.

What is claimed:

1. A method of performing adaptive bitrate streaming of media on a playback device using a plurality of alternative streams of encoded video packaged within extensible binary markup language (EBML) container files, wherein each of the alternative streams of video is the same source video encoded using different encoding parameters in such a way that each portion of encoded video packed into an element of an EBML container file commences with an intra frame starting a closed Group of Pictures (GOP) and each of the EBML container files includes at least one element that specifies the encoding parameters of the stream contained within the EBML container file, and wherein the plurality of alternative streams of encoded video include alternative streams of encoded video encoded at different maximum bitrates, the method comprising:

retrieving top level index data that identifies each of the plurality of EBML container files and describes at least the maximum bitrate of each of the alternative streams contained within the EBML container files;
parsing the top level index data to obtain information identifying the plurality of EBML container files;
requesting a portion of at least one of the EBML container files that contains the at least one element that specifies the encoding parameters of the stream contained within the EBML container file, wherein the at least one element that specifies the encoding parameters of the stream contained within the EBML container file specifies the frame height, frame width and sample aspect ratio of the video stream contained within the EBML container file;
retrieving an index that references each element containing portions of encoded video within at least one of the EBML container files;
utilizing the index to request portions of a first EBML container file that includes elements that contain portions of encoded video;
receiving and buffering the requested elements;
setting the frame height, frame width, and sample aspect ratio as specified by the at least one element in the requested portion of the at least one of the EBML container files prior to commencing decoding of the encoded video within the buffered elements;
decoding the encoded video contained within the buffered elements utilizing the encoding parameters;
measuring current streaming conditions by measuring the time taken to receive requested elements from the time at which the elements were requested; and
selecting another of the EBML container files from which to retrieve elements containing portions of encoded video for decoding, where the selection is based upon the measured streaming conditions and the description of the bitrate of the alternative stream contained within the top level index data.

2. A playback device configured to perform adaptive bitrate streaming using a plurality of alternative streams of encoded video packaged within extensible binary markup language (EBML) container files, wherein each of the plurality of alternative streams is the same source video encoded using different encoding parameters in such a way that each portion of encoded video packed into an element of an EBML container file commences with an intra frame starting a closed Group of Pictures (GOP) and each of the EBML container files includes at least one element that specifies the encoding parameters of the stream contained within the EBML container file, and wherein the plurality of alternative streams of encoded video include alternative streams of encoded video encoded at different maximum bitrates, the playback device comprising:

a processor configured, via a client application, to request portions of files from a remote server;
wherein the client application further configures the processor to:
retrieve top level index data that identifies a plurality of EBML container files and describes at least a maximum bitrate of the alternative streams contained within the EBML container files;
parse the top level index data to obtain information identifying the plurality of EBML container files;
request a portion of at least one of the EBML container files that contains the at least one element that specifies the encoding parameters of the stream contained within the EBML container file, wherein the at least one element that specifies the encoding parameters of the stream contained within the EBML container file specifies the frame height, frame width and sample aspect ratio of the video stream contained within the EBML container file;

retrieve an index that references each element containing portions of encoded video within at least one of the EBML container files;

utilize the index to request portions of a first EBML container file that includes elements that contain portions of encoded video;

receive and buffer the requested elements;

set the frame height, frame width, and sample aspect ratio as specified by the at least one element in the requested portion of the at least one of the EBML container files prior to commencing decoding of the encoded video within the buffered elements;

decode the encoded video contained within the buffered elements utilizing the encoding parameters;

measure current streaming conditions by measuring the time taken to receive requested elements from the time at which the elements were requested; and select another of the EBML container files from which to retrieve elements containing portions of encoded video for decoding, where the selection is based upon the measured streaming conditions and the description of the bitrate of the alternative stream contained within the top level data.

3. The playback device of claim 2, wherein:
each of the EBML container files comprises a plurality of Cluster elements, where each Cluster element contains a portion of encoded video; and
the portion of encoded video in each of the Cluster elements commences with an intra frame and includes at least one closed group of pictures.

4. The playback device of claim 3, wherein the portions of encoded video in each of the Cluster elements have the same duration.

5. The playback device of claim 3, wherein the portions of encoded video in each of the Cluster elements have a 2 second duration.

6. The playback device of claim 3, wherein each Cluster element contains a time code and each encoded frame of the portion of encoded video contained within the Cluster element is contained within a separate BlockGroup element.

7. The playback device of claim 6, wherein the first BlockGroup element in the Cluster element contains the intra frame.

8. The playback device of claim 7, wherein the first BlockGroup element contains a Block element, which specifies the time code attribute of the intra frame relative to the time code of the Cluster element.

9. The playback device of claim 2, wherein at least two of the alternative streams of encoded video are encoded at the same display aspect ratio, but with different resolutions using different sample aspect ratios.

10. The playback device of claim 2, wherein at least two of the alternative streams of encoded video are encoded at different frame rates.

11. The playback device of claim 10, wherein the at least one element in each of the EBML container files that specifies the encoding parameters of the stream contained within the EBML container file specifies the frame rate of the video stream contained within the EBML container file.

12. The playback device of claim 11, wherein the client application configures the processor to set the frame rate prior to commencing the decoding of encoded video contained within buffered elements from one of the EBML container files.

13. The playback device of claim 2, wherein the client application configures the playback device to request portions of files from remote servers via Hypertext Transfer Protocol (HTTP) byte range requests.

14. The playback device of claim 2, wherein the top level index data is SMIL data and the information that identifies the plurality of EBML container files is a plurality of Universal Resource Indicators (URIs) that identify the location of each of the EBML container files.

15. The playback device of claim 14, wherein the SMIL data specifies the maximum bitrate of the encoded stream contained within the EBML container file identified by each of the URIs.

16. The playback device of claim 15, wherein:
the index that references each of the elements containing portions of the encoded stream within the EBML container file is located within at least one element of the EBML container file;
the SMIL file specifies the portions of the EBML container file that contain the elements that contain the encoding parameters;
the client application further configures the processor to:
parse the SMIL file to identify the portions of the EBML container file that contain the elements that contain the encoding parameters; and
request the portions of the EBML container file that contain the elements that contain the encoding parameters.

17. The playback device of claim 2, wherein:
each EBML container file includes at least one element containing an index that references each element containing portions of encoded video within the EBML container file; and
the client application configures the processor to retrieve the index that references each element containing portions of encoded video within an EBML container file by requesting the portion of the EBML container file that includes the at least one element containing the index.

18. The playback device of claim 17, wherein the index is located within a Cues element within the EBML container file.

19. The playback device of claim 18, wherein the Cues element includes a plurality of CuePoint elements that include a time attribute and point to the location of each element containing a portion of encoded video within the EBML file.

20. The playback device of claim 19, wherein the client application configures the processor to:
search for the location of an element containing a specific portion of encoded video within the EBML file using the time attributes of the CuePoint elements within the index; and
request a portion of the EBML file including at least the element identified using the CuePoint elements.

21. The playback device of claim 2, wherein the encoding parameters utilized to decode the encoded video include at least one encoding parameter selected from the group consisting of frame rate, frame height, frame width, sample aspect ratio, maximum bitrate, and minimum buffer size.

22. The playback device of claim 2, wherein:
the client application configures the processor to initially request a portion of a first EBML container file containing at least one element that specifies the encoding parameters of the stream contained within the first EBML container file; and
the client application further configures the processor to request a portion of a second EBML container file containing at least one element that specifies the encoding parameters of the stream contained within the second EBML container file, when the client application selects to retrieve elements containing portions of encoded video for decoding from the second EBML container file based upon the measured streaming conditions and the description of the bitrate of the alternative stream contained within the top level index.

23. The playback device of claim 2, wherein the playback device is further configured to perform adaptive bitrate streaming using an EBML container file that contains a trick play track.

24. The playback device of claim 23, wherein the client application configures the processor to select the EBML container file containing the trick play track as the EBML container file from which to retrieve elements containing portions of encoded video in response to a user instruction.

25. The playback device of claim 2, wherein the playback device is further configured to perform adaptive streaming using at least one EBML container file containing a track of encoded audio.

26. The playback device of claim 25, wherein the client application configures the processor to retrieve and decode encoded audio from one of the at least one EBML container files containing an audio track and to synchronize the decoded audio with the decoded video.

27. The playback device of claim 2, wherein each of the EBML container files includes elements containing at least one track of encoded audio multiplexed with the encoded video.

28. The playback device of claim 27, wherein the client application is configured to:
 retrieve portions of the EBML file containing elements that include portions of one of the tracks of encoded audio;
 decode the retrieved encoded audio; and
 synchronize the decoded audio and the decoded video.

29. The playback device of claim 2, wherein the playback device is further configured to perform adaptive streaming using at least one EBML container file containing a subtitle track.

30. The playback device of claim 29, wherein the client application configures the processor to:
 retrieve subtitles from one of the at least one EBML container files containing a subtitle track;
 synchronize the subtitle with the decoded video; and
 overlay the subtitle over the decoded video.

31. The playback device of claim 2, wherein each of the EBML container files includes elements containing at least one subtitle track multiplexed with the encoded video.

32. The playback device of claim 31, wherein the client application is configured to:
 retrieve portions of the EBML file containing elements that include portions of one of the subtitle tracks;
 synchronize the subtitles with the decoded video; and
 overlay the subtitles on the decoded video.

* * * * *